US012676698B2

(12) United States Patent
Korany et al.

(10) Patent No.: US 12,676,698 B2
(45) Date of Patent: Jul. 7, 2026

(54) EFFECTIVENESS OF APPLICATION FORWARD ERROR CORRECTION

(71) Applicant: QUALCOMM Incorporated, San Diego, CA (US)

(72) Inventors: Belal Salama Amin Korany, San Diego, CA (US); Sanket Sanjay Kalamkar, San Diego, CA (US); Peerapol Tinnakornsrisuphap, San Diego, CA (US); Mickael Mondet, Louannec (FR); Ravi Agarwal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 629 days.

(21) Appl. No.: 18/190,914

(22) Filed: Mar. 27, 2023

(65) Prior Publication Data

US 2024/0333420 A1     Oct. 3, 2024

(51) Int. Cl.
| | |
|---|---|
| *H04L 1/00* | (2006.01) |
| *H04W 28/04* | (2009.01) |
| *H04W 28/06* | (2009.01) |

(52) U.S. Cl.
CPC ............. *H04L 1/004* (2013.01); *H04W 28/04* (2013.01); *H04W 28/06* (2013.01)

(58) Field of Classification Search
CPC ........ H04L 1/004; H04W 28/04; H04W 28/06
USPC ........................................................ 370/230
See application file for complete search history.

(56) References Cited

U.S. PATENT DOCUMENTS

| | | | |
|---|---|---|---|
| 2008/0098273 A1* | 4/2008 | Blankenship | ......... H04L 1/0066 714/746 |
| 2012/0011413 A1* | 1/2012 | Liu | ....................... H03M 13/25 714/746 |
| 2022/0109525 A1 | 4/2022 | Lin et al. | |
| 2023/0199221 A1* | 6/2023 | Stoica | .................... H04N 19/89 375/240.27 |

FOREIGN PATENT DOCUMENTS

WO     WO-2022016488 A1 *  1/2022   ........... H04L 1/0076

OTHER PUBLICATIONS

International Search Report and Written Opinion—PCT/US2024/017916—ISA/EPO—Jun. 10, 2024.

* cited by examiner

*Primary Examiner* — Intekhaab A Siddiquee
(74) *Attorney, Agent, or Firm* — Procopio, Cory, Hargreaves & Savitch LLP

(57)     ABSTRACT

Aspects presented herein may enable a UE to limit the number of transport blocks (TBs) per protocol data unit (PDU) set to a specified minimum number, such that the UE may not be specified to receive or transmit a large number of packets in one TB or in few TBs. In one aspect, a UE computes a FEC rate (F) for at least one PDU set size (f) and a number of partitions (D) for a division of the at least one PDU set size (f). The UE transmits, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

25 Claims, 16 Drawing Sheets

Example of a High SINR/MCS & RB Allocation

A packet data unit (PDU) set (e.g., a frame)

Packet

TB

- Single large TB
- Single TB loss → 100% PDU set loss
- Specify 100% redundancy to recover from single TB loss

500A

Example of a Low SINR/MCS & RB Allocation

A PDU set (e.g., a frame)

Packet

- N small TBs
- Single TB loss → ≈1/N PDU set loss
- Specify ≈(100/N) % redundancy to recover from single TB loss

500B

Figure 6:
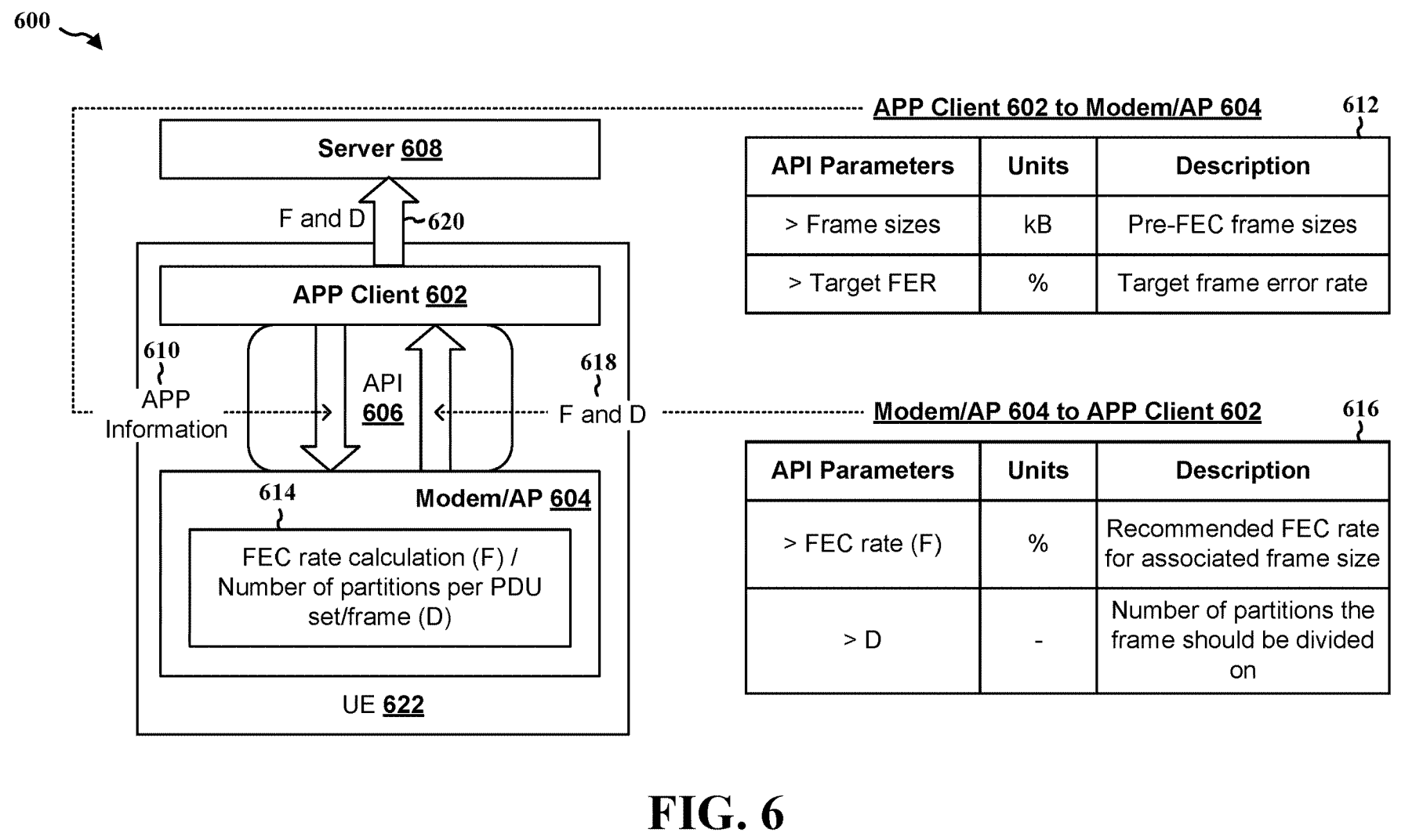

APP Client 602 to Modem/AP 604

| API Parameters | Units | Description |
|---|---|---|
| > Frame sizes | kB | Pre-FEC frame sizes |
| > Target FER | % | Target frame error rate |

612

Modem/AP 604 to APP Client 602

| API Parameters | Units | Description |
|---|---|---|
| > FEC rate (F) | % | Recommended FEC rate for associated frame size |
| > D | - | Number of partitions the frame should be divided on |

616

Server 608

620

APP Client 602

API 606

618

F and D

Modem/AP 604

614

FEC rate calculation (F) / Number of partitions per PDU set/frame (D)

F and D

610

APP Information

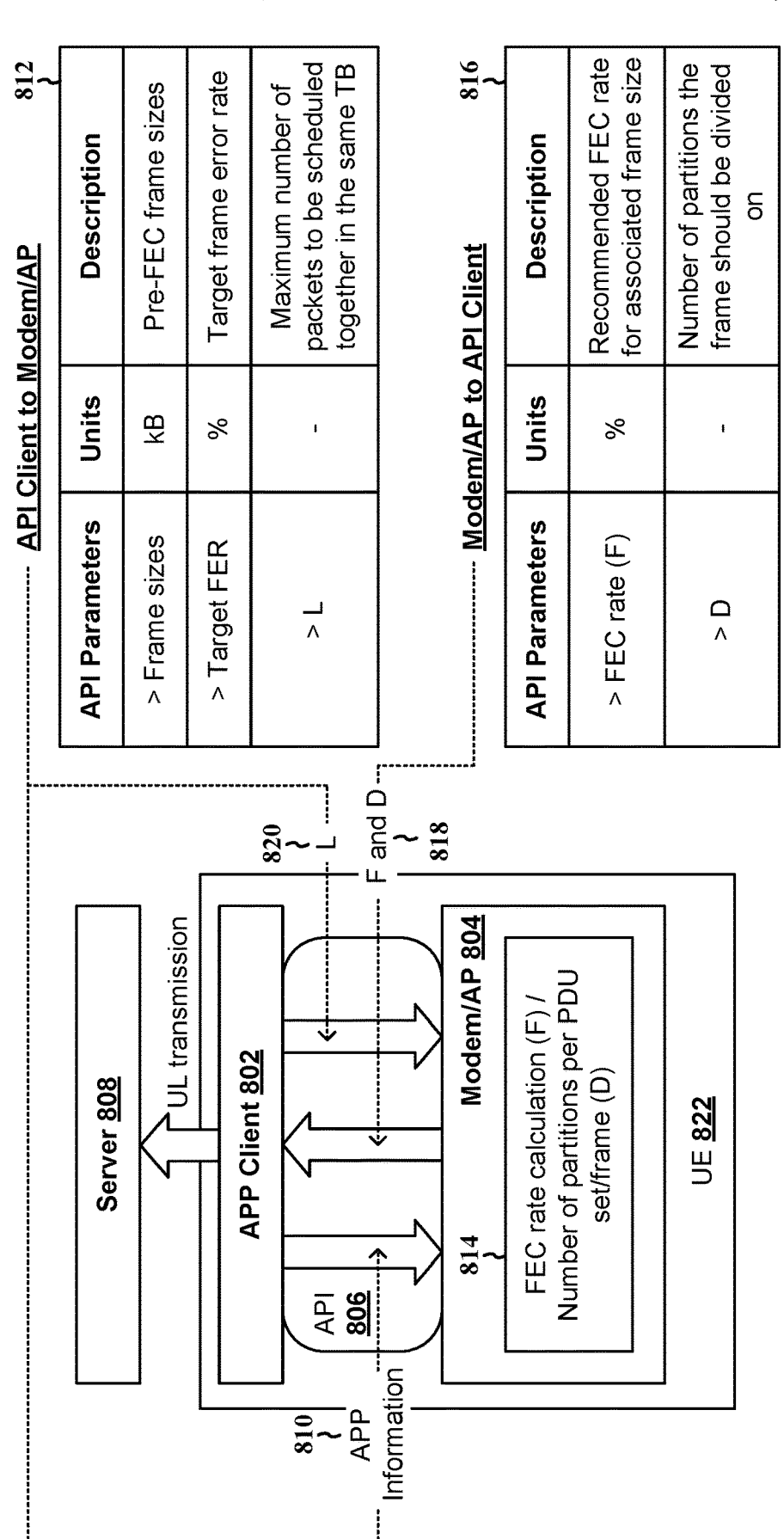

API Client to Modem/AP

| API Parameters | Units | Description |
|---|---|---|
| > Frame sizes | kB | Pre-FEC frame sizes |
| > Target FER | % | Target frame error rate |
| > L | - | Maximum number of packets to be scheduled together in the same TB |

812

Modem/AP to API Client

| API Parameters | Units | Description |
|---|---|---|
| > FEC rate (F) | % | Recommended FEC rate for associated frame size |
| > D | - | Number of partitions the frame should be divided on |

Figures 9A, 9B:
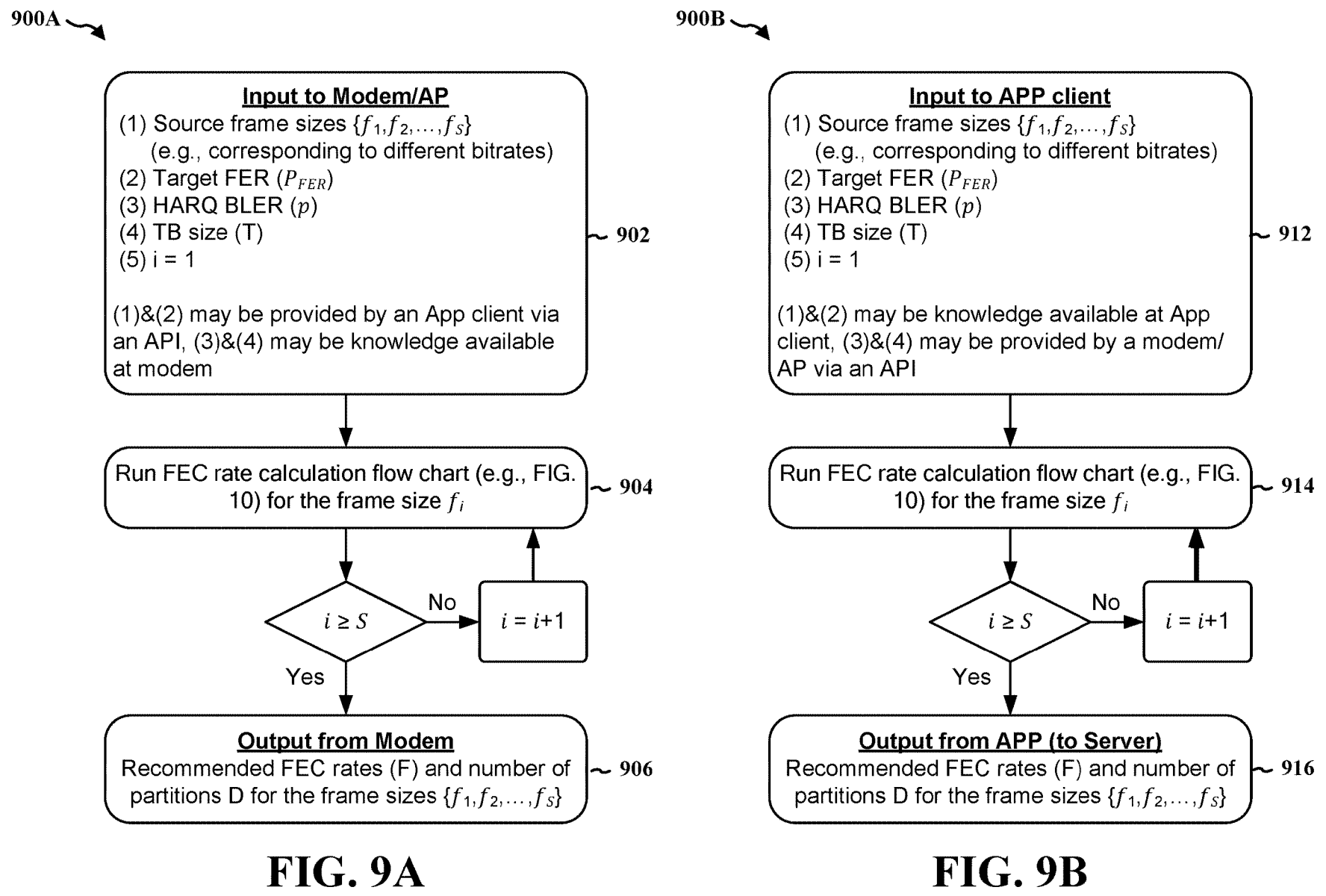

Input to APP client (1) Source frame sizes $\{f_1, f_2, \ldots, f_S\}$
    (e.g., corresponding to different bitrates)
(2) Target FER ($P_{FER}$)
(3) HARQ BLER ($p$)
(4) TB size (T)
(5) $i = 1$ (1)&(2) may be knowledge available at App client, (3)&(4) may be provided by a modem/AP via an API

912

Run FEC rate calculation flow chart (e.g., FIG. 10) for the frame size $f_i$

914

$i \geq S$

No → $i = i+1$

Yes

Output from APP (to Server)

Recommended FEC rates (F) and number of partitions D for the frame sizes $\{f_1, f_2, \ldots, f_S\}$

Input to Modem/AP (1) Source frame sizes $\{f_1, f_2, \ldots, f_S\}$
    (e.g., corresponding to different bitrates)
(2) Target FER ($P_{FER}$)
(3) HARQ BLER ($p$)
(4) TB size (T)
(5) $i = 1$ (1)&(2) may be provided by an App client via an API, (3)&(4) may be knowledge available at modem

902

Run FEC rate calculation flow chart (e.g., FIG. 10) for the frame size $f_i$

904

$i \geq S$

No → $i = i+1$

Yes

Output from Modem

Recommended FEC rates (F) and number of partitions D for the frame sizes $\{f_1, f_2, \ldots, f_S\}$

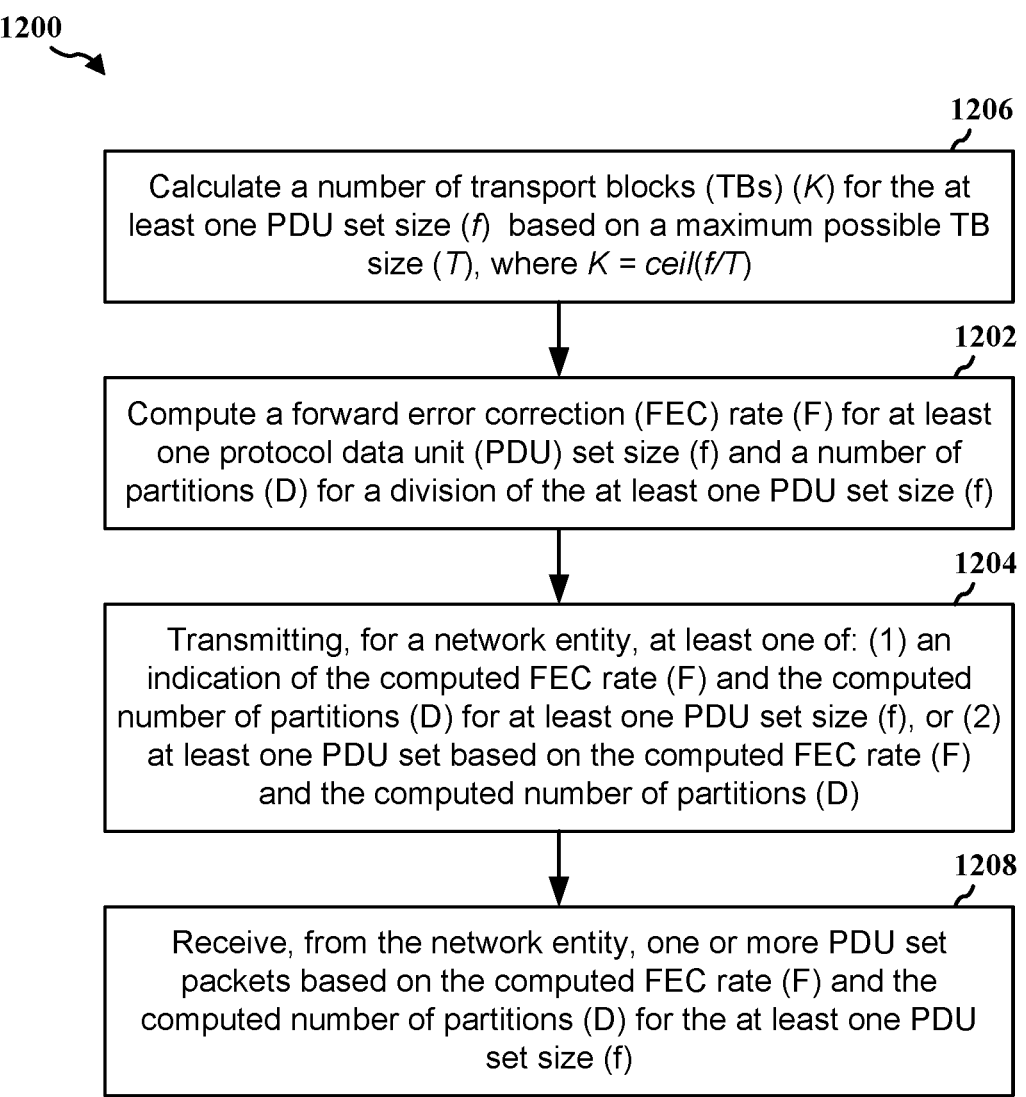

1200

1206

Calculate a number of transport blocks (TBs) ($K$) for the at least one PDU set size ($f$) based on a maximum possible TB size ($T$), where $K = ceil(f/T)$

1202

Compute a forward error correction (FEC) rate (F) for at least one protocol data unit (PDU) set size (f) and a number of partitions (D) for a division of the at least one PDU set size (f)

1204

Transmitting, for a network entity, at least one of: (1) an indication of the computed FEC rate (F) and the computed number of partitions (D) for at least one PDU set size (f), or (2) at least one PDU set based on the computed FEC rate (F) and the computed number of partitions (D)

1208

Receive, from the network entity, one or more PDU set packets based on the computed FEC rate (F) and the computed number of partitions (D) for the at least one PDU set size (f)

FIG. 12

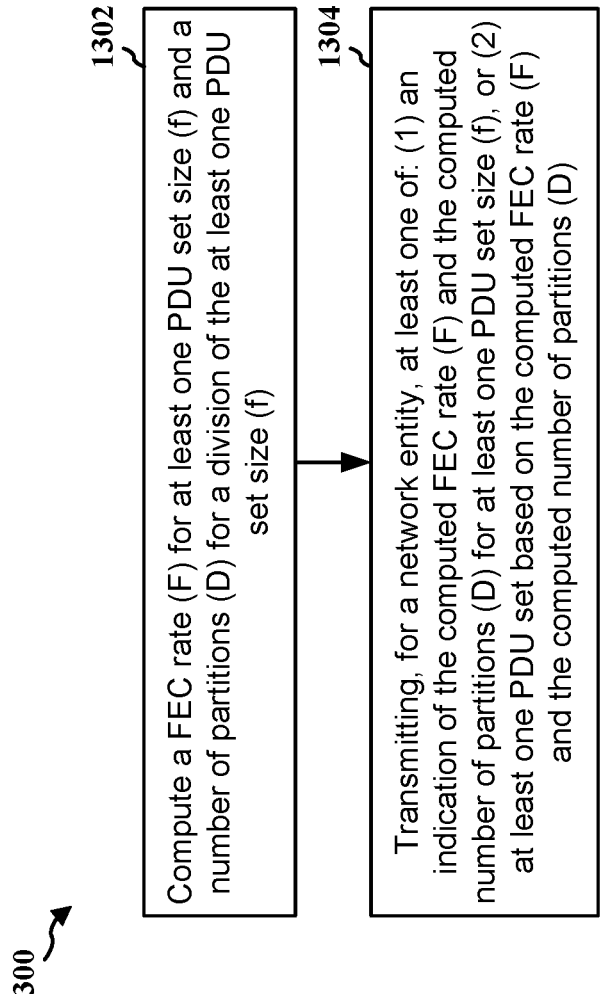

1300

1302

Compute a FEC rate (F) for at least one PDU set size (f) and a number of partitions (D) for a division of the at least one PDU set size (f)

1304

Transmitting, for a network entity, at least one of: (1) an indication of the computed FEC rate (F) and the computed number of partitions (D) for at least one PDU set size (f), or (2) at least one PDU set based on the computed FEC rate (F) and the computed number of partitions (D)

FIG. 13

EFFECTIVENESS OF APPLICATION FORWARD ERROR CORRECTION

TECHNICAL FIELD

The present disclosure relates generally to communication systems, and more particularly, to a wireless communication involving forward error correction (FEC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus computes a forward error correction (FEC) rate (F) for at least one protocol data unit (PDU) set size (f) and a number of partitions (D) for a division of the at least one PDU set size (f). The apparatus transmits, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

In an aspect of the disclosure, a method, a computer-readable medium, and an apparatus are provided. The apparatus receives, from a user equipment (UE), an indication of a FEC rate (F) and a number of partitions (D) for at least one PDU set size (f). The apparatus configures a set of packets based on the number of partitions (D) and the FEC rate (F) for a PDU set with the at least one PDU set size (f). The apparatus transmits, for the UE, the set of packets.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a diagram illustrating an example of limiting the minimum number of TBs per frame for a downlink (DL) operation in accordance with various aspects of the present disclosure.

FIG. 8 is a diagram illustrating an example of limiting the minimum number of TBs per frame for an uplink (UL) operation in accordance with various aspects of the present disclosure.

FIG. 9A is a flowchart illustrating an example modem/access point (AP) algorithm for calculating recommended FEC rates and number of partitions in accordance with various aspects of the present disclosure.

FIG. 9B is a flowchart illustrating an example App client algorithm for calculating recommended FEC rates and number of partitions in accordance with various aspects of the present disclosure.

FIG. 12 is a flowchart of a method of wireless communication.

FIG. 13 is a flowchart of a method of wireless communication.

DETAILED DESCRIPTION

Figure 1:
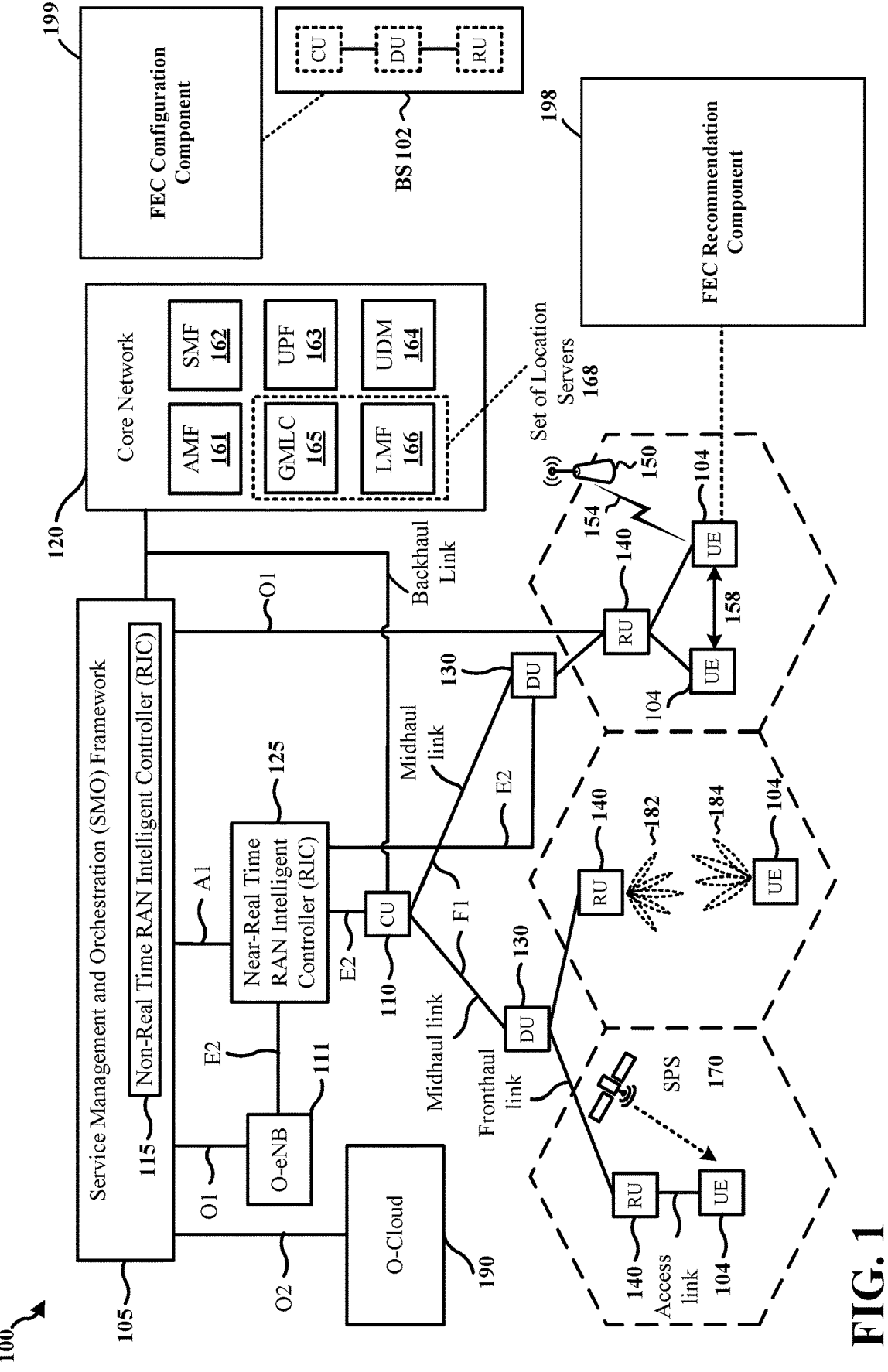
FIG. 1 is a diagram illustrating an example of a wireless communications system and an access network.

Aspects presented herein may improve the efficiency and effectiveness of application-layer forward error correction (FEC) by enabling a transmitting entity to limit the number of transport blocks (TBs) per protocol data unit (PDU) set (e.g., per frame/slice) to a specified number (e.g., to a specified minimum number of TBs ($K_{min}$)), such that the transmitting entity may not be specified to receive or transmit a large number of packets in one TB or in few TBs. For example, aspects presented herein may enable a FEC rate to be calculated based on comparing a configured number of TBs (K) with the specified minimum number of TBs ($K_{min}$) (e.g., based on max (K, $K_{min}$)), such that packets of a PDU set may spread out over a higher number of TBs. Aspects presented herein may also enable an application and a modem to exchange certain information (e.g., via an API) for optimization of FEC rate and the number of TBs per frame.

By specifying the transmitting entity to transmit a PDU set using at least a minimum number of TBs, the number of packets that may go on the same TB may be limited. Thus, the transmitting entity may apply a lower FEC rate to its transmissions (e.g., when the transmitting entity is configured with large size TBs), which may greatly reduce the transmission overhead. For example, the performance of application-layer FEC techniques in high MCS regimes, where the TB size is typically large, may be improved.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 inter-face). For virtualized network elements, the SMO Frame-work 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Addi-tionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and opti-mization of RAN elements and resources, artificial intelli-gence (AI)/machine learning (ML) (AI/ML) workflows including model training and updates, or policy-based guid-ance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Frame-work 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN manage-ment policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The commu-nication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 stan-dard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spec-trum, the UEs 104/AP 150 may perform a clear channel assessment (CCA) prior to communicating in order to deter-mine whether the channel is available.

The electromagnetic spectrum is often subdivided, based on frequency/wavelength, into various classes, bands, chan-nels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue some-times occurs with regard to FR2, which is often referred to (interchangeably) as a "millimeter wave" band in documents and articles, despite being different from the extremely high frequency (EHF) band (30 GHZ-300 GHz) which is iden-tified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are cur-rently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a FEC recommendation component 198 that may be configured to compute a FEC rate (F) for at least one PDU set size (f) and a number of partitions (D) for a division of the at least one PDU set size (f); and transmit, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

In certain aspects, the base station 102 may have a FEC configuration component 199 that may be configured to receive, from a UE, an indication of a FEC rate (F) and a number of partitions (D) for at least one PDU set size (f); configure a set of packets based on the number of partitions (D) and the FEC rate (F) for a PDU set with the at least one PDU set size (f); and transmit, for the UE, the set of packets.

Figures 2A, 2B, 2C, 2D:
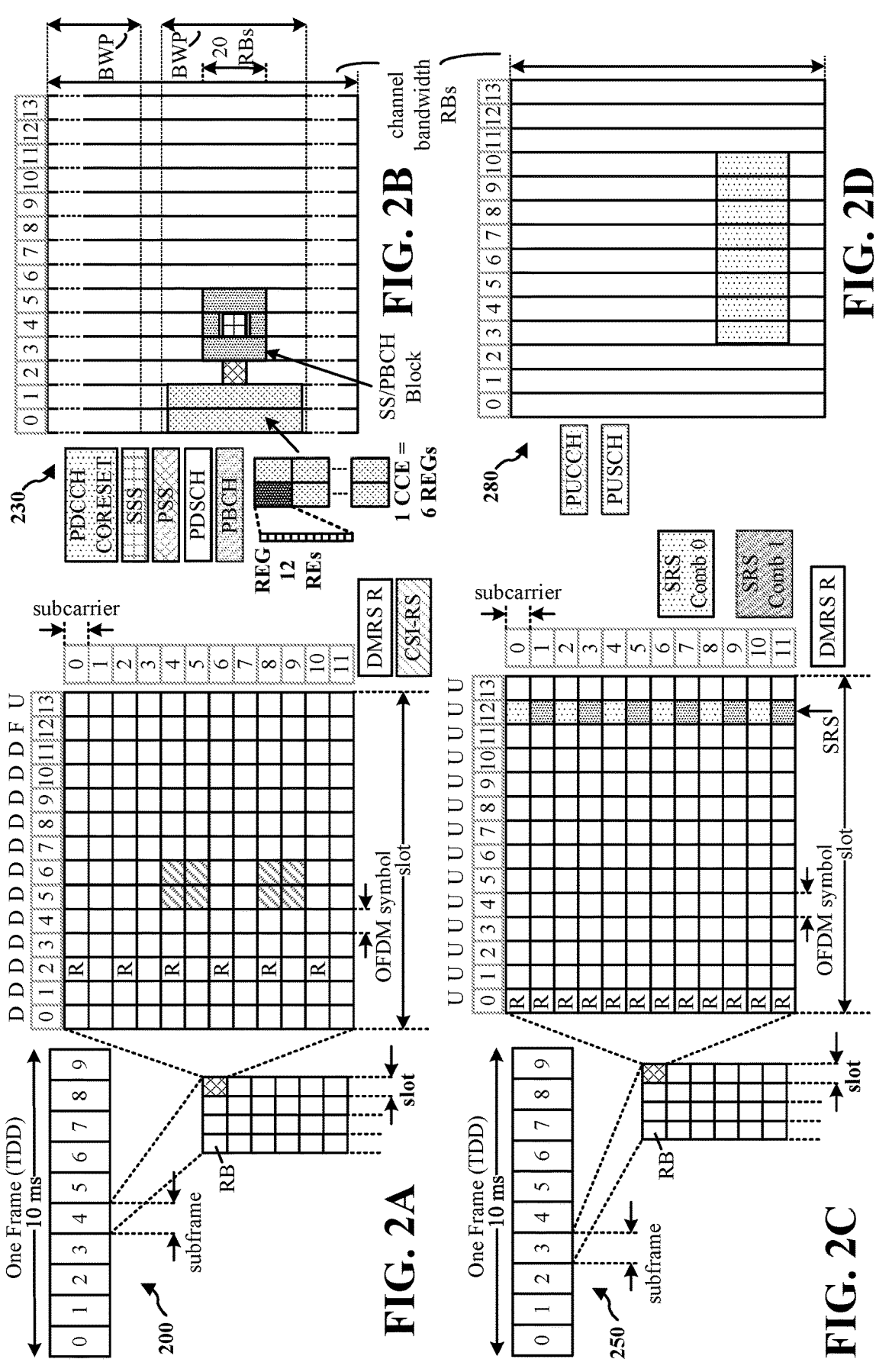
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^{\mu} \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
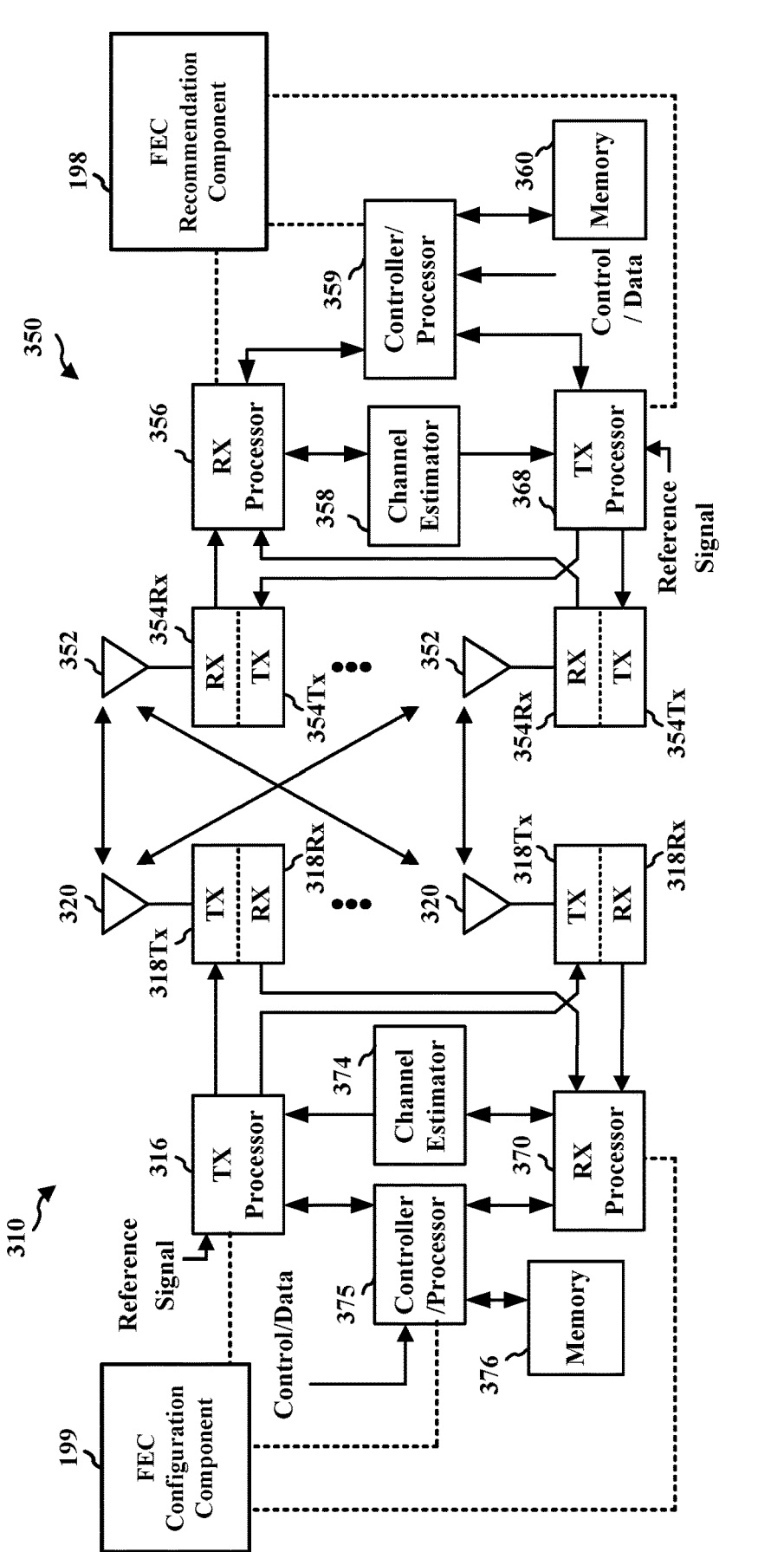
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the FEC recommendation component 198 of FIG. 1.

At least one of the TX processor 316, the RX processor 370, and the controller/processor 375 may be configured to perform aspects in connection with the FEC configuration component 199 of FIG. 1.

In some scenarios, tail latency may be an important metric in certain wireless communication applications (e.g., for 5G NR, cloud gaming, communications that specify low latency, etc.). Tail latency (which may also be referred to as "high-percentile latency") may refer to latencies that occur at the tail of a distribution curve, which is often used as a key performance metric for some applications or workloads. During a wireless communication, when a transmitting entity transmits a set of packets (e.g., Internet Protocol (IP) packets, where each IP packet may contain both a header and data) to a receiving entity but the receiving entity just receives a portion of the packets (e.g., some packets are lost), the receiving entity may notify the transmitting entity to retransmit the lost packets. However, such retransmission to recover lost packets may hurt the tail latency of the wireless communication as it may take additional time for the receiving entity to notify the transmitting entity regarding the lost packets and/or for the transmitting entity to resend the lost packets. For example, a hybrid automatic repeat request (HARQ) turn-around time may take approximately seven (7) milliseconds (ms), and a radio link control (RLC) retransmission may take approximately 35 ms, etc.

Forward error correction (FEC) at application may reduce communication entities' reliance on retransmission (or request for retransmission). FEC is a method of obtaining error control in data transmission in which the source (e.g., a transmitting entity such as a UE or a base station) may send redundant data and the destination (e.g., a receiving entity such as a UE or a base station) may recognize just the portion of the data that contains no apparent errors. For example, when a transmitting entity is configured to apply FEC to its transmission, the transmitting entity may be configured to transmit each packet twice. The receiving entity may check both instances of each packet for adherence to the protocol being used. If conformity occurs in both instances, the receiving entity may accept the packet. If conformity occurs in one instance and not in the other, the receiving entity may accept the packet that conforms to the protocol. If conformity does not occur in either instance, the receiving entity may reject the packet.

Figure 4:
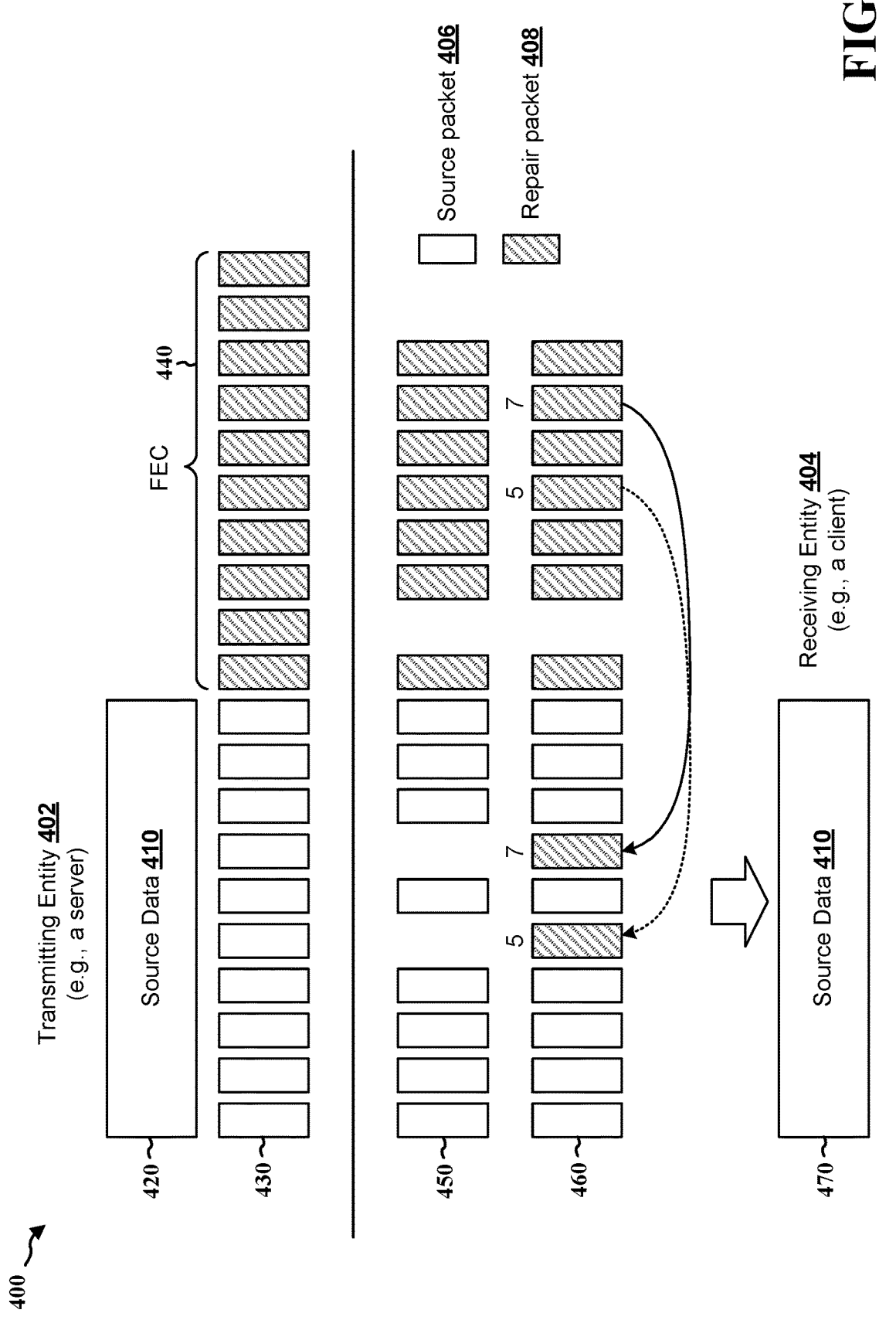
FIG. 4 is a diagram illustrating an example forward error correction (FEC) operation in accordance with various aspects of the present disclosure.

FIG. 4 is a diagram 400 illustrating an example FEC operation in accordance with various aspects of the present disclosure. As shown at 420, a transmitting entity 402 (e.g., a UE, a base station, a TRP, an application server, a user plane function (UPF), etc.) may be configured to transmit a source data 410 (which may be referred to as a set of protocol data units (PDUs)) to a receiving entity 404 (e.g., a UE, a base station, a TRP, an application server, a UPF, etc.).

As shown at 430, the transmitting entity 402 may segment the source data 410 into multiple source packets 406, such as source packets 1 to 10 (e.g., the number of source packets may depend on the capability of the transmitting entity 402, the available bandwidth configured for the transmitting entity, etc.). In addition to the multiple source packets 406, based on FEC rate, the transmitting entity 402 may also be configured to transmit certain number of repair packets 408 (which may also be referred to as "redundant packets"). For example, if the transmitting entity 402 transmits X source packets 406, the transmitting entity may also Y repair packets 408 (Y being same as or different from X).

As shown at 450, after the transmitting entity 402 transmits the source packets 406 and the repair packets 408, the receiving entity 404 may receive just a portion of the source packets 406 (and also just a portion of the repair packets 408), where some source packets may be missing (e.g., source packets #5 and #7). However, as shown at 460, if the receiving entity 404 successfully receives at least two repair packets, the receiving entity 404 may accept/use these repair packets to recover the lost source packets.

Then, as shown at 470, after sufficient packets are received (e.g., total 10 source and/or repair packets), the receiving entity 404 may decode the received packets to obtain the source data 410. In other words, application FEC may enable data, e.g., a video frame/slice, a PDU set, etc., to be decoded once sufficient packets are received.

As FEC may enable a receiving entity to recover certain lost packets without requesting the transmitting entity to retransmit (reTx) these lost packets, the application-layer FEC may provide benefit over radio access network (RAN) optimization (e.g., modulation and coding scheme (MCS), block error rate (BLER) target, etc.) as communication entities may have control over the percentage of FEC (FEC rate/redundancy (%)) applied. In some examples, FEC may specify out-of-order packet delivery from lower layers (e.g., enabled via cross-layer application programming interface (API) on 5G NR).

In some implementations, an application (App) may determine a FEC rate to be applied on a transmission based on end-to-end performance measures (e.g., based on round-trip time (RTT), frame error rate (FER), etc.). A FEC rate may refer to a ratio of the number of repair packets to the number of source packets in a FEC operation. In some examples, FEC rate may also be referred as a redundancy rate/percentage. For example, the FEC rate for the example discussed in connection with FIG. 4 may be (Y/X) %. Also, for instance, if the FEC rate applied is 50% or ½, then the number of repair packets is half of the number of source packets (e.g., 10 source packets 406 and 5 repair packets 408). In some examples, an application (App) or App client may not determine or modify the FEC rate dynamically for its transmission if the receiving entity is not responsive to fast channel conditions, if there is a large delay to collect sufficient samples, and/or if the application does not have physical (PHY) layer and/or media access controller (MAC) layer performance metrics, etc. (e.g., HARQ/RLC retransmission). In some examples, based on using cross-layer API, a modem (e.g., of a UE) may assist an application with FEC rate recommendation based on channel conditions. For example, the modem may calculate a FEC rate to meet a target frame error rate (FER), such as based on a current HARQ BLER, e.g., residual BLER or $1^{st}$ Tx BLER may be used where the former may result in a lower recommended FEC rate while the latter may result in a lower latency (e.g., frames are decodable after $1^{st}$ Tx). In some examples, the FEC rate may also be calculated based on average transport block (TB) size.

Figures 5A, 5B:
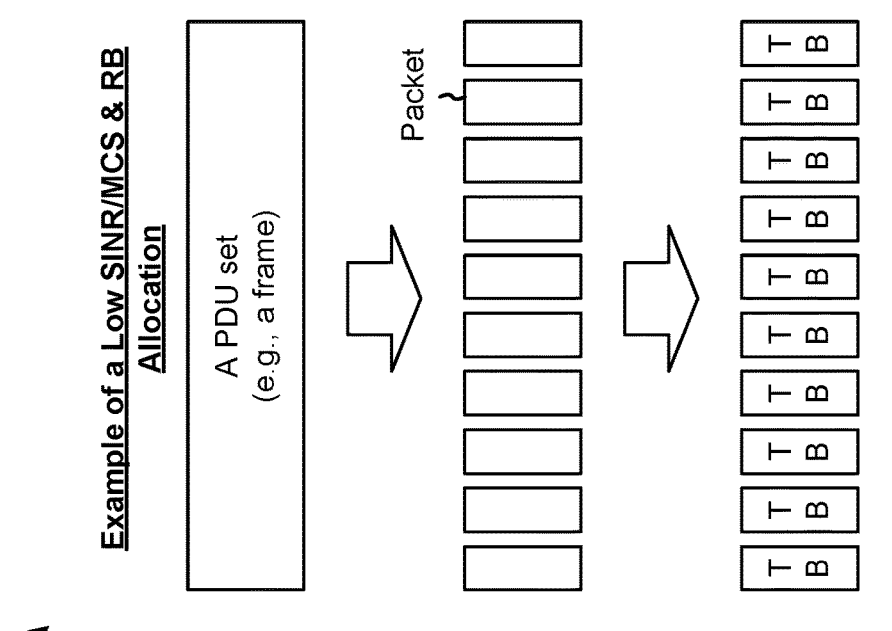
FIG. 5A is a diagram illustrating an example of a FEC rate determination depending on a transport block (TB) size in accordance with various aspects of the present disclosure.
FIG. 5B is a diagram illustrating another example of a FEC rate determination depending on a TB size in accordance with various aspects of the present disclosure.

FIG. 5A is a diagram 500A illustrating an example of a FEC rate determination depending on a TB size in accordance with various aspects of the present disclosure. A transmitting entity may be configured to transmit a PDU set (e.g., a video frame/slice, etc.) via a plurality of packets (e.g., via multiple packets as discussed in connection with FIG. 4). If the transmitting entity transmits all of the plurality of packets using a single TB (e.g., a large size TB), a single TB loss may correspond to a loss of all packets. As such, the transmitting entity may specify a 100% FEC rate to recover from the single TB loss (as the transmitting entity may not be able to transmit just a portion of a TB). In other words, the transmitting entity may be configured to transmit the same number of repair packets as that of source packets, leading to 100% FEC rate.

For purposes of the present disclosure, a PDU set may refer to a group of PDUs, which may constitute a frame/slice (e.g., a video frame or a video slice, such as a minimum unit specified for a video frame/slice to be decodable). A PDU in a PDU set may correspond to a packet (e.g., an IP packet). In one example, if an original PDU set is x PDUs, when a FEC rate (A %) is applied over the PDU set, a group of packets (roughly (1+A/100)*x PDUs) may be generated and transmitted by the transmitting entity. For examples below, a PDU set may refer to an original PDU set before applying the FEC.

FIG. 5B is a diagram 500B illustrating another example of a FEC rate determination depending on a TB size in accordance with various aspects of the present disclosure. On the other hand, if the transmitting entity transmits the plurality of packets using multiple smaller size TBs, such as one TB per packet (e.g., N TBs for N packets), then a single TB loss may just correspond to a packet loss (e.g., 1/N of PDU set loss instead of 100% PDU set loss in the case of large TB size example). As such, the transmitting entity may specify a much lower FEC rate (e.g., approximately 100/N %) to recover from the single TB loss. In other words, the transmitting entity may be able to add the number of repair packets that is just a portion of the number of source packets for the FEC.

As illustrated by FIGS. 5A and 5B, FEC rate calculation depending on TB size may suffer from certain drawbacks. For example, FEC rate recommendation may be quantized with a step size of 1/K, where K is the number of TBs per PDU set (or per frame) (e.g., K=ceil (PDU set size/average TB size)). In a high MCS regime (e.g., a very small K), large (and unnecessary) FEC overhead may be added to the transmission. For example, as shown by FIG. 5A, if K=1 (e.g., 1 TB per PDU set), a 100% FEC rate may be specified for the transmission (e.g., adding an additional 100% overhead to the transmission). Also, in the high MCS regime, FEC redundant (e.g., repair) packets may share the same (and very few) TBs as the source packets, where a target FER may not be achieved by the transmitting entity.

For example, consider a scenario where a HARQ BLER is set to be 0.1 (10%), a target FER is set to be 0.01 (1%), and one PDU set (e.g., one frame) is represented in ten (10) packets (as illustrated by FIG. 5A). If a transmitting entity transmits a transmission using a high MCS where a TB configured for the transmitting entity is capable of carrying 20 packets, then the number of TBs per PDU set may be one (1) (e.g., K=1). Then, a modem may recommend a FEC rate=100% (e.g., a minimum possible recommendation), such as described in connection with FIG. 5A. If the transmitting entity (e.g., a base station, a gNB, etc.) enqueues all 20 packets (10 source packets plus 10 redundant packets) at the same time, they may share the same TB. This may lead the FER to remain at 0.1 (e.g., unable to meet the target FER of 0.01), despite the 100% redundancy.

Aspects presented herein may improve the efficiency and effectiveness of application-layer forward error correction (FEC) by enabling a transmitting entity to limit the number of transport blocks (TBs) per PDU set (e.g., per frame/slice) to a specified number (e.g., to a specified minimum number of TBs ($K_{min}$)), such that the transmitting entity may not be specified to receive or transmit a large number of packets in one TB or in few TBs. For example, aspects presented herein may enable a FEC rate to be calculated based on comparing a configured number of TBs (K) with the specified minimum number of TBs ($K_{min}$) (e.g., based on max (K, $K_{min}$)), such that packets of a PDU set may spread out over a higher number of TBs. Aspects presented herein may also enable an application and a modem to exchange certain information (e.g., via an API) for optimization of FEC rate and the number of TBs per frame. By specifying the transmitting entity to transmit a PDU set using at least a minimum number of TBs, the number of packets that may go on the same TB may be limited. Thus, the transmitting entity may apply a lower FEC rate to its transmissions (e.g., when the transmitting entity is configured with large size TBs), which may greatly reduce the transmission overhead. For example, the performance of application-layer FEC techniques in high MCS regimes, where the TB size is typically large, may be improved.

FIG. 6 is a diagram 600 illustrating an example of limiting the minimum number of TBs per frame for a downlink (DL) operation in accordance with various aspects of the present disclosure. While the example uses "frame" and "frame size" for illustration, aspects presented herein may also apply to other types of data formats, such as a PDU set, a data unit, a video slice, etc.

As shown at 610, an application (App) client 602 may provide App information to a modem/access point (AP) 604 (e.g., to an intelligence in the modem) through an API 606. As shown by the table at 612, the App information may include a set of pre-FEC frame sizes and/or a target frame error rate, etc. In one example, the App client 602 and the modem/AP 604 may be associated with the same entity, such as a receiving entity, a UE 622, etc.

As shown at 614, after receiving the App information from the App client 602 and based on the App information, for each frame size (e.g., each pre-FEC frame size in the set of pre-FEC frame sizes), the modem/AP 604 may calculate a FEC rate recommendation (F), as well as the number of partitions the frame should be divided on (D), such as shown by the table at 616. Then, as shown at 618, the modem/AP 604 may feed the calculated FEC rate recommendation (F) and the number of partitions (D) back to the App client 602.

Then, as shown at 620, the App client 602 may communicate information received from the modem/AP 604 (e.g., the calculated FEC rate recommendation (F) and the number of partitions (D) to a server 608 (e.g., a network entity, a base station, etc.), where the server 608 may generate frame packets with the recommended FEC rate (F) (e.g., with a % redundancy), such as described in connection with FIG. 5B. For example, the server 608 may spread out the generation of all frame packets (e.g., source packets plus redundant packets) over D different partitions, and the server 608 may transmit these frame packets (e.g., to the receiving entity, the UE 622, etc.) over multiple TBs. As such, aspects presented herein may enable the minimum number of TBs per frame to be specified for a DL operation. In some examples, the time difference between the generation of two consecutive partitions may be configured to be greater than or equal to (≥) a maximum slot duration.

Figure 7:
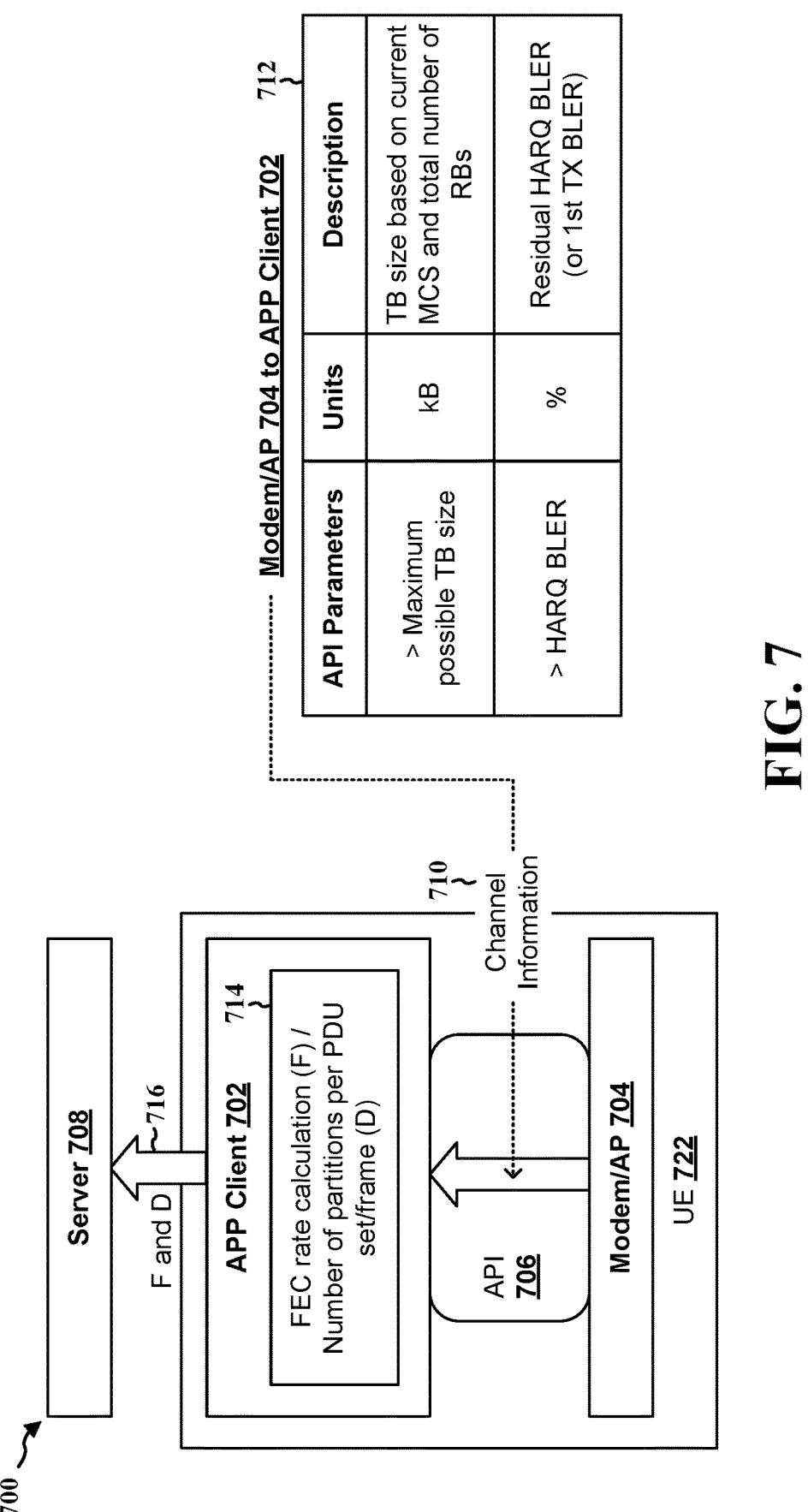
FIG. 7 is a diagram illustrating another example of limiting the minimum number of TBs per frame for a DL operation in accordance with various aspects of the present disclosure.

FIG. 7 is a diagram 700 illustrating another example of limiting the minimum number of TBs per frame for a DL operation in accordance with various aspects of the present disclosure. While the example uses "frame" and "frame size" for illustration, aspects presented herein may also apply to other types of data formats, such as a PDU set, a data unit, a video frame, etc.

As shown at 710, a modem/AP 704 may provide channel information to an App client 702 (e.g., to an intelligence in the App client) through an API 706. As shown by the table at 712, the channel information may include a maximum possible TB size and/or a HARQ BLER, etc. In one example, the App client 702 and the modem/AP 704 may be associated with the same entity, such as a receiving entity, a UE 722, etc.

As shown at 714, after receiving the channel information from the modem/AP 704 and based on the channel information, the App client 702 may calculate FEC rate (F), as well as the number of partitions the frame should be divided on (D). Then, as shown at 716, the App client 702 may communicate the calculated FEC rate recommendation (F) and the number of partitions (D) to a server 708 (e.g., a network entity, a base station, etc.), where the server 708 may generate frame packets with the recommended FEC rate (F) (e.g., with a % redundancy), such as described in connection with FIG. 5B. For example, the server 708 may spread out the generation of all frame packets (e.g., source packets plus redundant packets) over D different partitions, and the server 708 may transmit these frame packets (e.g., to the receiving entity, the UE 722, etc.) over multiple TBs. As such, aspects presented herein may enable the minimum number of TBs per frame to be specified for a DL operation. In some examples, the time difference between the generation of two consecutive partitions may be configured to be greater than or equal to (≥) a maximum slot duration.

FIG. 8 is a diagram 800 illustrating an example of limiting the minimum number of TBs per frame for an uplink (UL) operation in accordance with various aspects of the present disclosure. While the example uses "frame" and "frame size" for illustration, aspects presented herein may also apply to other types of data formats, such as a PDU set, a data unit, a video frame, etc. Also, in UL, a modem may divide a frame into multiple TBs in a MAC scheduler.

As shown at 810, an App client 802 may provide App information to a modem/AP 804 (e.g., to an intelligence in the modem) through an API 806. As shown by the table at 812, the App information may include a set of pre-FEC frame sizes and/or a target frame error rate, etc. In one example, the App client 802 and the modem/AP 804 may be associated with the same entity, such as a transmitting entity, a UE 822, etc.

As shown at 814, after receiving the App information from the App client 802 and based on the App information, for each frame size (e.g., each pre-FEC frame size in the set of pre-FEC frame sizes), the modem/AP 804 may calculate a FEC rate recommendation (F), as well as the number of partitions the frame should be divided on (D), such as shown by the table at 816. Then, as shown at 818, the modem/AP 804 may feed the calculated FEC rate recommendation (F) and the number of partitions (D) back to the App client 802.

Based on the calculated FEC rate recommendation (F) and the number of partitions (D) from the modem/AP 804, the App client 802 may generate the frame, and as shown at 820, the App client 802 may also communicate the maximum number of packets (L) (e.g., L=round (frame size/packet size/D) to the modem/AP 804. In response, the MAC scheduler is refrained from scheduling more than L packets in the same UL slot. Then, the transmitting entity (e.g., a UE) associated with the App client 802 and the modem/AP 804 may transmit these frame packets (e.g., to a server 808, a base station, etc.) over multiple TBs (e.g., with no more than L packets in an UL slot). As such, aspects presented herein may enable the minimum number of TBs per frame to be specified for an UL operation.

In one aspect of the present disclosure, the number of TBs per frame (or per PDU set) (K) may be calculated based on K=ceil (frame size/maximum possible TB size). The frame size may be provided by an App client (e.g., the App client 602, 702, 802, etc.) to a modem/AP (e.g., the modem/AP 604, 704, 804, etc.) if the calculation is performed in the modem/AP. On the other hand, the maximum possible TB size may be provided by a modem/AP (e.g., the modem/AP 604, 704, 804, etc.) to an App client (e.g., the App client 602, 702, 802, etc.) if the calculation is performed in the App client.

As described above, a minimum number of TBs per frame ($K_{min}$) may be defined for the App client (e.g., the App client 602, 702, 802, etc.) and/or the modem/AP (e.g., the modem/AP 604, 704, 804, etc.) (collectively as a UE hereafter as both the App client and the modem/AP may be located within a UE). In one aspect of the present disclosure, if the number of TBs per frame (K) calculated by the UE (e.g., based on K=ceil (frame size/maximum possible TB size)) is greater than or equal to the defined minimum number of TBs per frame ($K_{min}$) (e.g., $K \geq K_{min}$), the frame may be automatically divided on sufficient TBs (e.g., based on K) at the server/base station/UPF (e.g., for DL) or at the UE (e.g., for UL). For example, the server may be configured to generate all frame packets together (e.g., D=1), and the FEC rate may be calculated based on K, such as described in connection with FIGS. 6 and 7. On the other hand, if the number of TBs per frame (K) calculated by the UE is smaller than the defined minimum number of TBs per frame ($K_{min}$) (e.g., $K < K_{min}$), the UE may calculate the FEC rate based on the defined minimum number of TBs per frame ($K_{min}$). As such, for DL, the server may be specified/configured to spread the generation of the frame packets over D=$K_{min}$ partitions, such as described in connection with FIGS. 7 and 8. For UL, the UE may divide the frame onto multiple TBs by limiting the number of frame packets that the MAC schedules in the same UL slot, such as described in connection with FIG. 8.

As an illustration, referring back to FIGS. 5A and 5B where a frame (e.g., a PDU set) may include ten (10) packets, if a minimum number of TBs per frame ($K_{min}$) is defined to be five (e.g., $K_{min}$=5), the UE may calculate the FEC to be 20% (e.g., $D=K_{min}=5\rightarrow$FEC rate=20%). After indicating this information (e.g., the FEC rate (F) and the number of partitions (D)) to the server, the server may generate the frame's 12 packets (e.g., 10 source packets plus 2 redundant packets) on 5 different partitions. In some examples, the time between generation of two consecutive partitions may be configured to be greater than or equal to a slot duration, such that there may be a higher chance that the different partitions are scheduled in different slots (e.g., TBs). With the minimum number of TBs per frame ($K_{min}$) configured, the target FER (e.g., 0.01) may be achieved by the UE with just 20% redundancy (e.g., FEC rate).

In another example, if five UEs coexisted and they are not configured with a minimum number of TBs per frame ($K_{min}$), as shown by FIG. 5A, each UE may send its frame with a 100% redundancy in one slot and with FER of 0.1, which may take a significant overhead (e.g., 20 packets from each UE and 100 packets in total). However, if the five UEs are configured with a minimum number of TBs per frame as described above (e.g., $K_{min}=5$), each UE may add just 20% redundancy and divide the frame into 5 partitions (each UE transmits 12 packets and 60 packets in total). In addition, as the frame partition of each UE takes fewer resource blocks (RBs) in a slot, this may enable partitions of different UEs to be transmitted in one slot based on frequency division multiplexing (FDM). For example, the 2 redundancy packets from five UEs (total of 10 redundancy packets) may be FDMed on one slot, which may greatly improve the resource utilization/allocation for wireless communications between the UEs and the network. In some scenarios, all frames may be transmitted using five DL slots with FER of 0.01.

In another aspect of the present disclosure, a UE may be configured to determine the minimum number of TBs per frame ($K_{min}$) based on multiple factors. For example, the UE may consider a larger $K_{min}$ to have a better FEC rate granularity (e.g., each granularity is few % in difference). However, a larger $K_{min}$ may also mean the last packet may be delayed by $K_{min}$ DL slots, so a packet delay budget (PDB) may limit how large $K_{min}$ may be configured/used by the UE.

FIG. 9A is a flowchart 900A illustrating an example modem/AP algorithm for calculating recommended FEC rates (F) and number of partitions (D) in accordance with various aspects of the present disclosure. As described in connection with FIGS. 6 and 8, in some implementations, a modem/AP (e.g., the modem/AP 604, 804) may be configured (responsible) for calculating recommended FEC rates (F) and number of partitions (D) for different PDU set sizes. For purposes of the illustration, each PDU set may correspond to a frame (e.g., a video frame, a data frame, etc.).

At 902, the modem/AP may obtain various inputs specified for calculating recommended FEC rates (F) and number of partitions (D) for different frame sizes, which may include: (1) source frame sizes $\{f_1, f_2, \ldots, f_s\}$ (e.g., corresponding to different bitrates), (2) a target FER ($P_{FER}$), (3) a HARQ BLER (p), (4) a TB size (T), and (5) i=1 (e.g., an iteration starting at 1). The source frame sizes and the target FER may be provided by an App client (e.g., the App client 602, 802), whereas the HARQ BLER and the TB size may be knowledge available at the modem/AP.

At 904, after obtaining the inputs, the modem/AP may calculate the FEC rate for each frame size ($f_i$) in the source frame sizes $\{f_1, f_2, \ldots, f_s\}$ until i=S. For example, the modem/AP may calculate a first FEC rate for a first source frame size ($f_1$), a second FEC rate for a second source frame size ($f_2$), and an $S^{th}$ FEC rate for an $S^{th}$ source frame size ($f_s$), etc.

Figure 10:
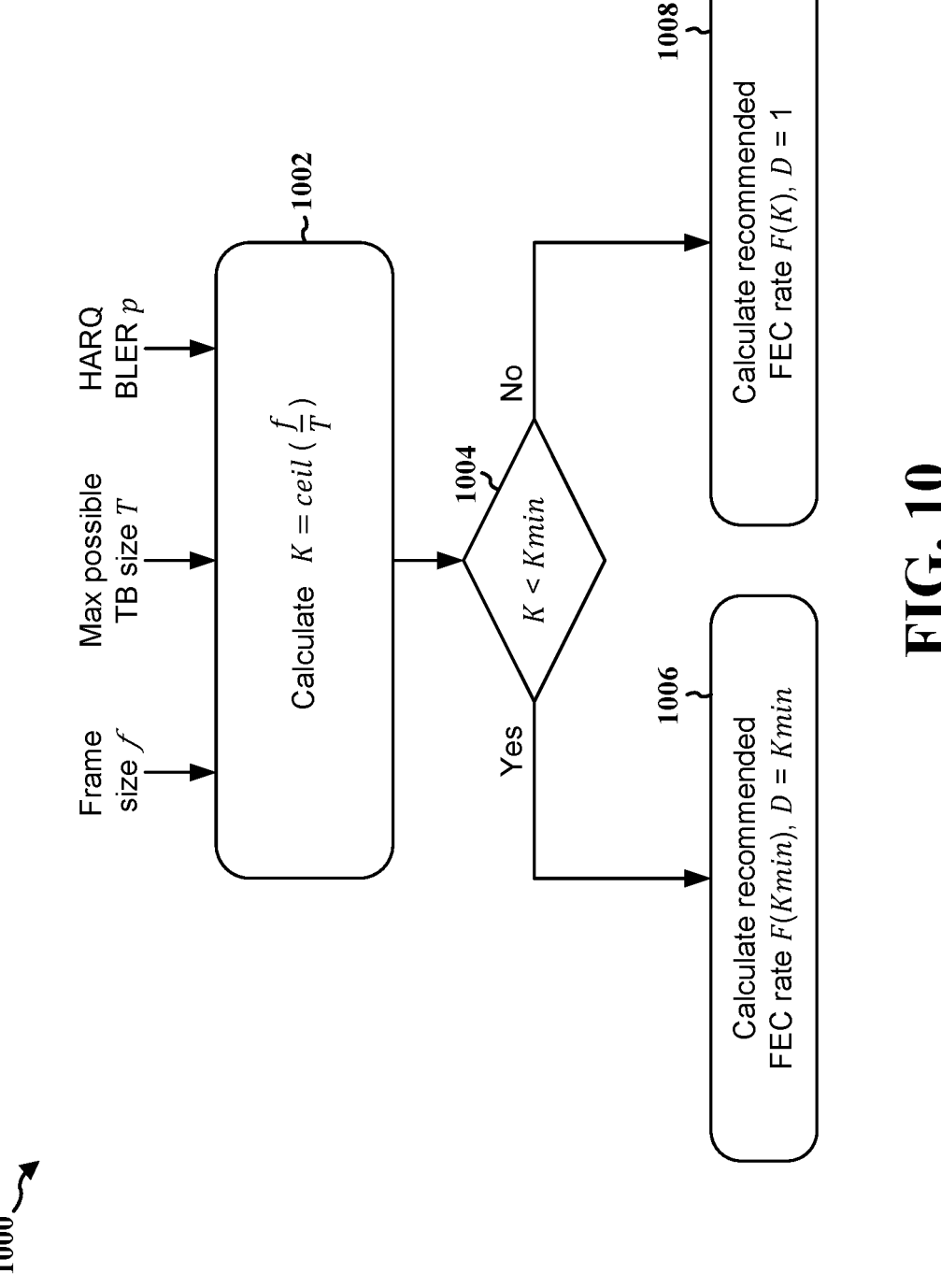
FIG. 10 is a flowchart illustrating an example of calculating FEC rate and number of partitions for a frame size in accordance with various aspects of the present disclosure.

FIG. 10 is a flowchart 1000 illustrating an example of calculating FEC rate (F) and number of partitions (D) for a frame size (f) in accordance with various aspects of the present disclosure.

At 1002, based on a frame size (f), a maximum possible TB size (T), and a HARQ BLER (p), a number of TBs (K) for the frame size (f) may be calculated based on $$K = \text{ceil}\left(\frac{f}{T}\right).$$

Ceil ( ) may refer to a ceiling function in which the smallest successive integer is returned. In other words, the ceiling function of a real number x is the least integer that is greater than or equal to the given number x. The ceiling function may be defined as: f(x)=minimum {$a\in Z$; $a\geq x$}.

At 1004, the calculated number of TBs (K) for the frame size (f) may be compared to a pre-defined minimum number of TBs ($K_{min}$). As shown at 1006, if the calculated number of TBs (K) is smaller than the pre-defined minimum number of TBs ($K_{min}$) (e.g., $K<K_{min}$), the FEC rate (F) may be computed based on the pre-defined minimum number of TBs ($K_{min}$) and the number of partitions (D) may be equal to the pre-defined minimum number of TBs ($K_{min}$) (e.g., F ($K_{min}$), $D=K_{min}$, etc.). On the other hand, as shown at 1008, if the calculated number of TBs (K) is greater than or equal to the pre-defined minimum number of TBs ($K_{min}$) (e.g., $K\geq K_{min}$), the FEC rate (F) may be computed based on the calculated number of TBs (K) and the number of partitions (D) may be equal to one (e.g., F(K), D=1, etc.).

Figures 11A, 11B:
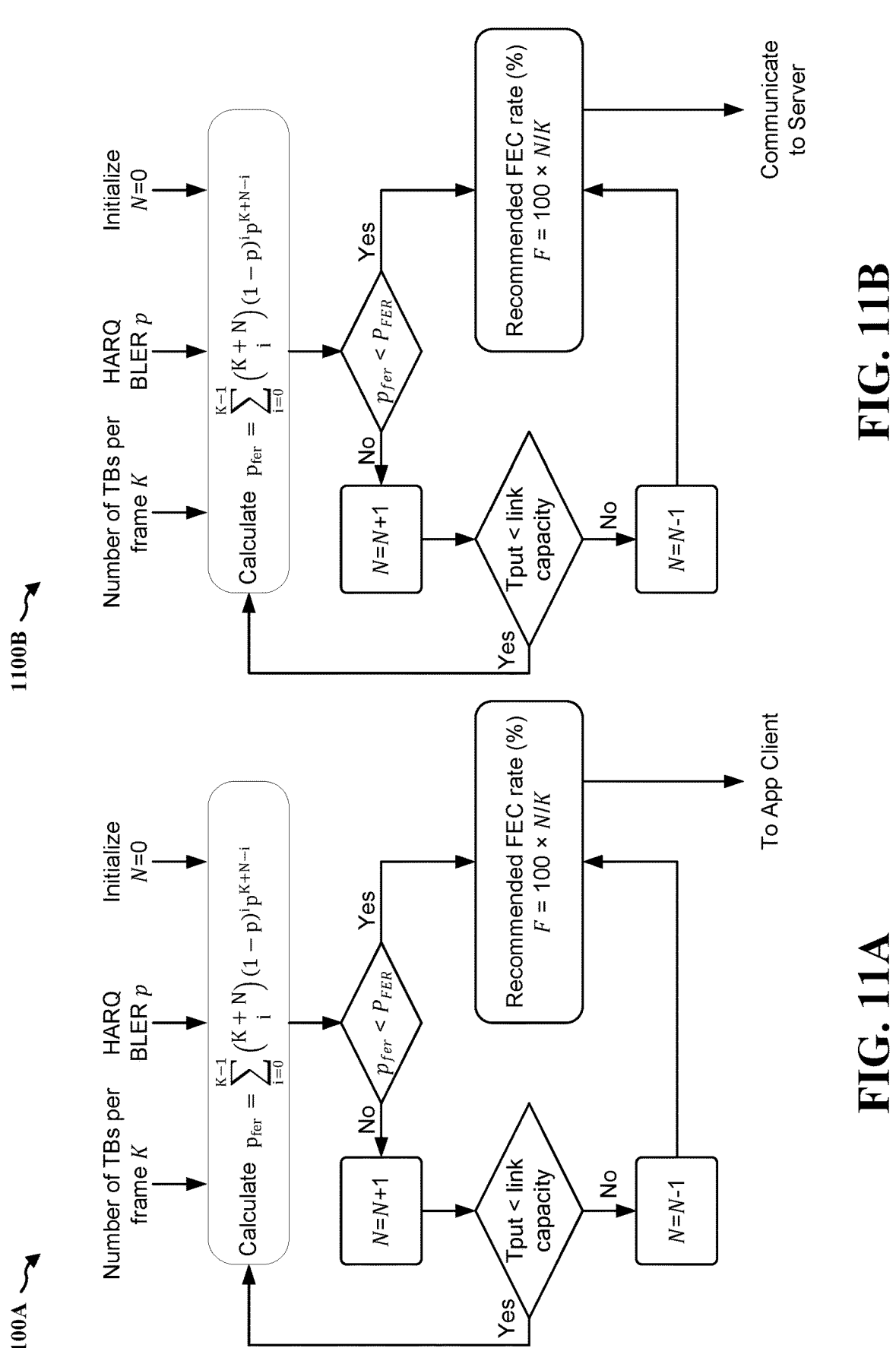
FIG. 11A is a flowchart illustrating an example algorithm for calculating recommended FEC rates at a modem/AP in accordance with various aspects of the present disclosure.
FIG. 11B is a flowchart illustrating an example algorithm for calculating recommended FEC rates at an App client in accordance with various aspects of the present disclosure.

FIG. 11A is a flowchart 1100A illustrating an example algorithm for calculating recommended FEC rates (F) at a modem/AP in accordance with various aspects of the present disclosure. A modem/AP (e.g., the modem/AP 604, 804) may calculate a frame error rate (FER) ($p_{fer}$) for a number of TBs per frame (K) based on $$p_{fer} = \sum_{i=0}^{K-1} \binom{K+N}{i}(1-p)^i p^{K+N-i},$$

where K corresponds to the number of TBs per frame (e.g., obtained from flowchart 1000 of FIG. 10, which may be a pre-defined minimum number of TBs ($K_{min}$)), p corresponds to a HARQ BLER, and N is initialized to be zero (e.g., N=0). Then, the calculated FER ($p_{fer}$) may be compared to a target FER ($P_{FER}$). Based on the comparison, the modem/AP may derive a recommended FEC rate (%) based on $F=100\times N/K$, and the modem/AP may pass/transmit the derived recommended FEC rate to an App client (e.g., the App client 602, 802).

Referring back to the flowchart 900A of FIG. 9A, at 906, the modem/AP may output the recommended FEC rate (F) and number of partitions (D) for the frame sizes $\{f_1, f_2, \ldots, f_s\}$, such as to the App client as described in connection with FIGS. 6 and 8.

FIG. 9B is a flowchart 900B illustrating an example App client algorithm for calculating recommended FEC rates (F) and number of partitions (D) in accordance with various aspects of the present disclosure. As described in connection with FIG. 7, in some implementations, an App client (e.g., the App client 702) may be configured (responsible) for calculating recommended FEC rates (F) and number of partitions (D) for different PDU set sizes. For purposes of the illustration, each PDU set may corresponds to a frame (e.g., a video frame, a data frame, etc.).

At 912, the App client may obtain various inputs specified for calculating recommended FEC rates (F) and number of partitions (D) for different frame sizes, which may include: (1) source frame sizes $\{f_1, f_2, \ldots, f_s\}$ (e.g., corresponding to different bitrates), (2) a target FER ($P_{FER}$), (3) a HARQ BLER (p), (4) a TB size (T), and (5) i=1 (e.g., an iteration starting at 1). The source frame sizes and the target FER may be knowledge available at the App client, whereas the HARQ BLER and the TB size may be provided by a modem/AP (the modem/AP 704) via an API.

At 914, after obtaining the inputs, the App client may calculate the FEC rate for each frame size ($f_i$) in the source frame sizes $\{f_1, f_2, \ldots, f_s\}$ until i=S. For example, the App client may calculate a first FEC rate for a first source frame size ($f_1$), a second FEC rate for a second source frame size ($f_2$), and an $S^{th}$ FEC rate for an $S^{th}$ source frame size ($f_s$), etc.

In one example, as described in connection with FIG. 10, the App client may calculate FEC rate (F) and number of partitions (D) for a frame size (f) based on a pre-defined minimum number of TBs ($K_{min}$). For example, referring back to FIG. 10, at 1002, based on a frame size (f), a maximum possible TB size (T), and a HARQ BLER (p), a number of TBs (K) for the frame size (f) may be calculated based on K=ceil(f/T). Then, at 1004, the calculated number of TBs (K) for the frame size (f) may be compared to a pre-defined minimum number of TBs ($K_{min}$). As shown at 1006, if the calculated number of TBs (K) is smaller than the pre-defined minimum number of TBs ($K_{min}$) (e.g., K<$K_{min}$), the FEC rate (F) may be computed based on the pre-defined minimum number of TBs ($K_{min}$) and the number of partitions (D) may be equal to the pre-defined minimum number of TBs ($K_{min}$) (e.g., F ($K_{min}$), D=$K_{min}$, etc.). On the other hand, as shown at 1008, if the calculated number of TBs (K) is greater than or equal to the pre-defined minimum number of TBs ($K_{min}$) (e.g., K≥$K_{min}$), the FEC rate (F) may be computed based on the calculated number of TBs (K) and the number of partitions (D) may be equal to one (e.g., F(K), D=1, etc.). FIG. 11B is a flowchart 1100B illustrating an example algorithm for calculating recommended FEC rates (F) at an App client in accordance with various aspects of the present disclosure. An App client (e.g., the App client 702) may calculate a frame error rate (FER) ($p_{fer}$) for a number of TBs per frame (K) based on $$p_{fer} = \sum_{i=0}^{K-1} \binom{K+N}{i}(1-p)^i p^{K+N-i},$$

where K corresponds to the number of TBs per frame (e.g., obtained from flowchart 1000 of FIG. 10, which may be a pre-defined minimum number of TBs ($K_{min}$)), p corresponds to a HARQ BLER, and N is initialized to be zero (e.g., N=0). Then, the calculated FER ($p_{fer}$) may be compared to a target FER ($P_{FER}$). Based on the comparison, the App client may derive a recommended FEC rate (%) based on F=100×N/K, and the modem/AP may pass/transmit the derived recommended FEC rate to a server (e.g., the server 708).

Referring back to the flowchart 900B of FIG. 9B, at 916, the App client may output the recommended FEC rate (F) and number of partitions (D) for the frame sizes $\{f_1, f_2, \ldots, f_s\}$, such as to a server (e.g., the server 708) as described in connection with FIG. 7.

Aspects provide herein may improve tail latency of FEC at application (e.g., for XR and cloud gaming, etc.) over 5G.

In one aspect, FEC rate may be decided by an App not responsive to fast channel conditions, which may have large delay due to sample collection, and without PHY/MAC performance metrics considered. In another aspect, a modem may assist an App with FEC rate recommendation based on channel conditions. As FEC rate calculation depending on TB size have certain drawbacks, aspects presented herein propose FEC rate calculation by limiting the minimum number of TBs per frame so as to spread a PDU set (e.g., a frame/slice) into multiple TBs to reduce unnecessary FEC overhead. The PDU set/frame/slice size and TB size may be provided by an App and/or a modem respectively. The minimum number of TBs per frame may be determined based on factors such as better FEC granularity and PDB.

FIG. 12 is a flowchart 1200 of a method of wireless communication. The method may be performed by a UE (e.g., the UE 104, 622, 722, 822; the transmitting entity 402; the receiving entity 404; the apparatus 1404). The method may enable the UE to limit the number of TBs per PDU set to a specified number (e.g., to a specified minimum K ($K_{min}$)), such that the UE may not be specified to receive or transmit a large number of packets in one TB or in few TBs.

At 1202, the UE may compute a FEC rate (F) for at least one PDU set size (f) and a number of partitions (D) for a division of the at least one PDU set size (f), such as described in connection with FIGS. 6-8, 9A, 9B, 10, 11A, and 11B. For example, as shown at 614 of FIG. 6, the UE 622 (e.g., the modem/AP 604 of the UE 622) may compute a FEC rate (F) for a frame size (f) and a number of partitions (D) for a division of the frame size (f). The computation of the FEC rate and the number of partitions may be performed by, e.g., the FEC recommendation component 198, the application processor 1406, the cellular baseband processor 1424, and/or the transceiver(s) 1422 of the apparatus 1404 in FIG. 14.

In one example, the at least one PDU set size may be at least one frame size, or at least one slice size.

In another example, computing the FEC rate (F) and the number of partitions (D) may include computing the FEC rate (F) and the number of partitions (D) with a modem of the UE.

In another example, computing the FEC rate (F) and the number of partitions (D) may include computing the FEC rate (F) and the number of partitions (D) with an application (App) running on the UE.

At 1204, the UE may transmit, for a network entity, at least one of: (1) an indication of the computed FEC rate (F) and the computed number of partitions (D) for at least one PDU set size (f), or (2) at least one PDU set based on the computed FEC rate (F) and the computed number of partitions (D), such as described in connection with FIGS. 6-8, 9A, 9B, 10, 11A, and 11B. For example, as shown at 620 of FIG. 6, the UE 622 may transmit a computed FEC rate (F) for a frame size (f) and the number of partitions (D) for the division of the frame size (f) to a server 608. The transmission of the indication and/or the at least one PDU set may be performed by, e.g., the FEC recommendation component 198, the application processor 1406, the cellular baseband processor 1424, and/or the transceiver(s) 1422 of the apparatus 1404 in FIG. 14.

In one example, the network entity corresponds to a base station, a user plane function (UPF), or an application server.

In another example, as shown at 1206, the UE may calculate a number of transport blocks (TBs) (K) for the at least one PDU set size (f) based on a maximum possible TB size (T), where $$K = \text{ceil}\left(\frac{f}{T}\right).$$

such as described in connection with FIGS. 6-8, 9A, 9B, 10, 11A, and 11B. For example, as shown at 1002 of FIG. 10, the modem/AP or App client of a UE may calculate a number of TBs (K) for a frame size (f) based on a maximum possible TB size (T), where $$K = \text{ceil}\left(\frac{f}{T}\right).$$

Figure 14:
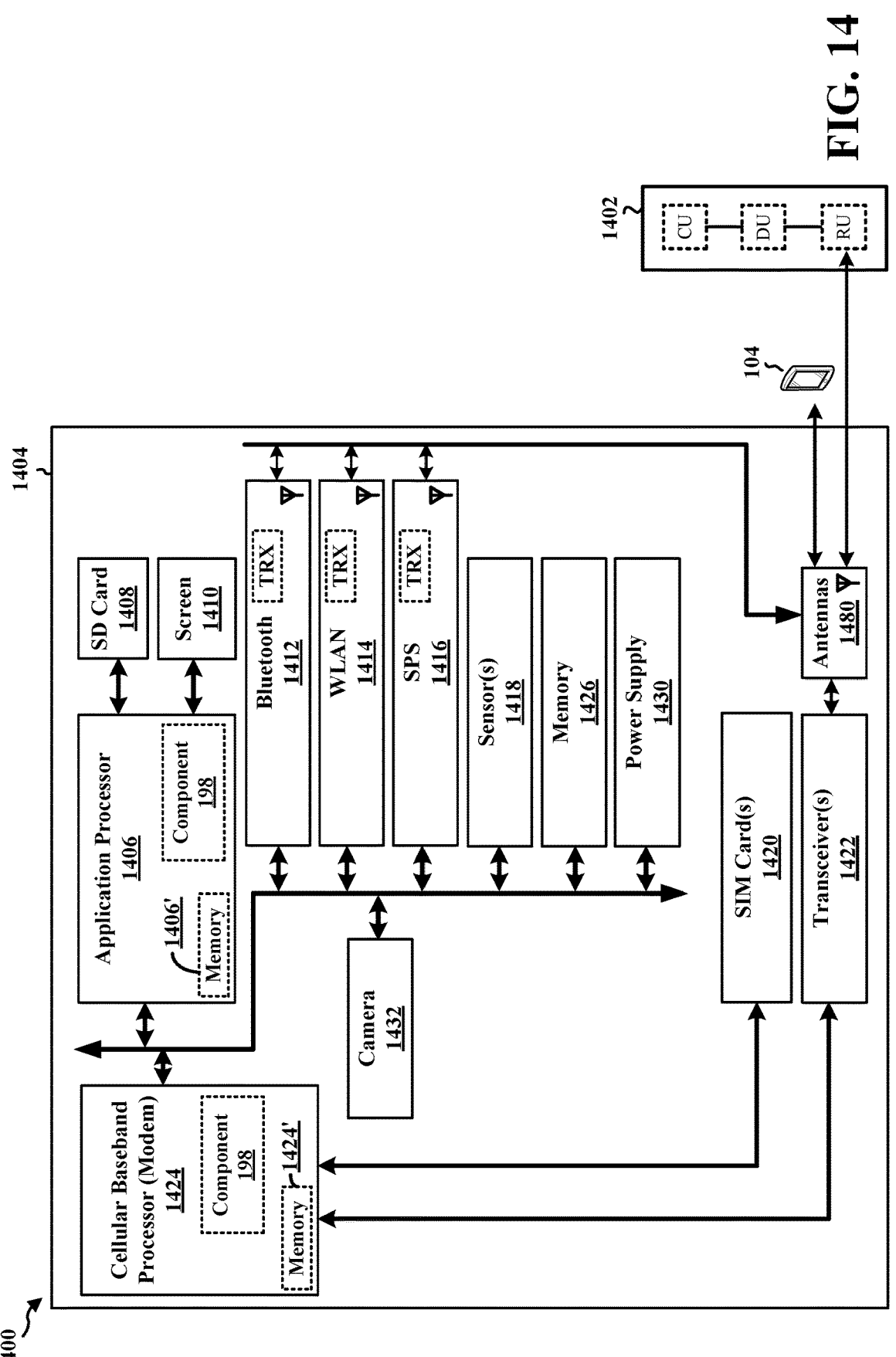
FIG. 14 is a diagram illustrating an example of a hardware implementation for an example apparatus and/or network entity.

The calculation of the number of transport blocks may be performed by, e.g., the FEC recommendation component 198, the application processor 1406, the cellular baseband processor 1424, and/or the transceiver(s) 1422 of the apparatus 1404 in FIG. 14.

In another example, to compute the FEC rate (F) for the at least one PDU set size (f) and the number of partitions (D) for the division of the at least one PDU set size (f), the UE may compute the FEC rate (F) for the at least one PDU set size (f) and the number of partitions (D) for the division of the at least one PDU set size (f) based on a comparison of the calculated number of TBs (K) with a pre-defined minimum number of TBs ($K_{min}$). In some implementations, if the calculated number of TBs (K) is smaller than the pre-defined minimum number of TBs ($K_{min}$) (K<$K_{min}$), the FEC rate (F) may be computed based on the pre-defined minimum number of TBs ($K_{min}$) and the number of partitions (D) may be equal to the pre-defined minimum number of TBs ($K_{min}$) (F ($K_{min}$), D=$K_{min}$). In some implementations, if the calculated number of TBs (K) is greater than or equal to the pre-defined minimum number of TBs ($K_{min}$) (K≥$K_{min}$), the FEC rate (F) may be computed based on the calculated number of TBs (K) and the number of partitions (D) may be equal to one (F(K), D=1). In some implementations, the pre-defined minimum number of TBs ($K_{min}$) may be based on: an FEC granularity, a packet delay budget (PDB), or a combination thereof. In some implementations, the pre-defined minimum number of TBs ($K_{min}$) is greater than one. In some implementations, the maximum possible TB size (T) may correspond to an amount of information that can be carried in a current slot if all RBs are assigned to the UE. In some implementations, to calculate the maximum possible TB size (T) may include calculating the maximum possible TB size (T) based on: an MCS, a TB size history, an RB allocation history, or a combination thereof.

In another example, as shown at 1208, the UE may receive, from the network entity, one or more PDU set packets based on the computed FEC rate (F) and the computed number of partitions (D) for the at least one PDU set size (f), such as described in connection with FIGS. 6-8, 9A, 9B, 10, 11A, and 11B. For example, as discussed in connection with FIG. 6, the UE 622 may transmit the calculated/recommended FEC rate (F) for a PDU set size (f) and the number of partitions (D) for the division of the PDU set size (f) to a server 608. In response, the UE 622 may receive one or more PDU packets from the server 608 based on the calculated/recommended FEC rate (F) and the number of partitions (D). The reception of the one or more PDU set packets may be performed by, e.g., the FEC recommendation component 198, the application processor 1406, the cellular baseband processor 1424, and/or the transceiver(s) 1422 of the apparatus 1404 in FIG. 14.

FIG. 13 is a flowchart 1300 of a method of wireless communication. The method may be performed by a UE (e.g., the UE 104, 622, 722, 822; the transmitting entity 402; the receiving entity 404; the apparatus 1404). The method may enable the UE to limit the number of TBs per PDU set to a specified number (e.g., to a specified minimum K ($K_{min}$)), such that the UE may not be specified to receive or transmit a large number of packets in one TB or in few TBs.

At 1302, the UE may compute a FEC rate (F) for at least one PDU set size (f) and a number of partitions (D) for a division of the at least one PDU set size (f), such as described in connection with FIGS. 6-8, 9A, 9B, 10, 11A, and 11B. For example, as shown at 614 of FIG. 6, the UE 622 (e.g., the modem/AP 604 of the UE 622) may compute a FEC rate (F) for a frame size (f) and a number of partitions (D) for a division of the frame size (f). The computation of the FEC rate and the number of partitions may be performed by, e.g., the FEC recommendation component 198, the application processor 1406, the cellular baseband processor 1424, and/or the transceiver(s) 1422 of the apparatus 1404 in FIG. 14.

In one example, the at least one PDU set size may be at least one frame size, or at least one slice size.

In another example, computing the FEC rate (F) and the number of partitions (D) may include computing the FEC rate (F) and the number of partitions (D) with a modem of the UE.

In another example, computing the FEC rate (F) and the number of partitions (D) may include computing the FEC rate (F) and the number of partitions (D) with an application (App) running on the UE.

At 1304, the UE may transmit, for a network entity, at least one of: (1) an indication of the computed FEC rate (F) and the computed number of partitions (D) for at least one PDU set size (f), or (2) at least one PDU set based on the computed FEC rate (F) and the computed number of partitions (D), such as described in connection with FIGS. 6-8, 9A, 9B, 10, 11A, and 11B. For example, as shown at 620 of FIG. 6, the UE 622 may transmit a computed FEC rate (F) for a frame size (f) and the number of partitions (D) for the division of the frame size (f) to a server 608. The transmission of the indication and/or the at least one PDU set may be performed by, e.g., the FEC recommendation component 198, the application processor 1406, the cellular baseband processor 1424, and/or the transceiver(s) 1422 of the apparatus 1404 in FIG. 14.

In one example, the network entity corresponds to a base station, a user plane function (UPF), or an application server.

In another example, the UE may calculate a number of transport blocks (TBs) (K) for the at least one PDU set size (f) based on a maximum possible TB size (T), where $$K = \text{ceil}\left(\frac{f}{T}\right).$$

such as described in connection with FIGS. 6-8, 9A, 9B, 10, 11A, and 11B. For example, as shown at 1002 of FIG. 10, the modem/AP or App client of a UE may calculate a number of TBs (K) for a frame size (f) based on a maximum possible TB size (T), where $$K = \text{ceil}\left(\frac{f}{T}\right).$$

The calculation of the number of transport blocks may be performed by, e.g., the FEC recommendation component 198, the application processor 1406, the cellular baseband processor 1424, and/or the transceiver(s) 1422 of the apparatus 1404 in FIG. 14.

In another example, to compute the FEC rate (F) for the at least one PDU set size (f) and the number of partitions (D) for the division of the at least one PDU set size (f), the UE may compute the FEC rate (F) for the at least one PDU set size (f) and the number of partitions (D) for the division of the at least one PDU set size (f) based on a comparison of the calculated number of TBs (K) with a pre-defined minimum number of TBs ($K_{min}$). In some implementations, if the calculated number of TBs (K) is smaller than the pre-defined minimum number of TBs ($K_{min}$) ($K<K_{min}$), the FEC rate (F) may be computed based on the pre-defined minimum number of TBs ($K_{min}$) and the number of partitions (D) may be equal to the pre-defined minimum number of TBs ($K_{min}$) (F ($K_{min}$). D=$K_{min}$). In some implementations, if the calculated number of TBs (K) is greater than or equal to the pre-defined minimum number of TBs ($K_{min}$) ($K\geq K_{min}$), the FEC rate (F) may be computed based on the calculated number of TBs (K) and the number of partitions (D) may be equal to one (F(K), D=1). In some implementations, the pre-defined minimum number of TBs ($K_{min}$) may be based on: an FEC granularity, a packet delay budget (PDB), or a combination thereof. In some implementations, the pre-defined minimum number of TBs ($K_{min}$) is greater than one. In some implementations, the maximum possible TB size (T) may correspond to an amount of information that can be carried in a current slot if all RBs are assigned to the UE. In some implementations, to calculate the maximum possible TB size (T) may include calculating the maximum possible TB size (T) based on: an MCS, a TB size history, an RB allocation history, or a combination thereof.

In another example, the UE may receive, from the network entity, one or more PDU set packets based on the computed FEC rate (F) and the computed number of partitions (D) for the at least one PDU set size (f), such as described in connection with FIGS. 6-8, 9A, 9B, 10, 11A, and 11B. For example, as discussed in connection with FIG. 6, the UE 622 may transmit the calculated/recommended FEC rate (F) for a PDU set size (f) and the number of partitions (D) for the division of the PDU set size (f) to a server 608. In response, the UE 622 may receive one or more PDU packets from the server 608 based on the calculated/recommended FEC rate (F) and the number of partitions (D). The reception of the one or more PDU set packets may be performed by, e.g., the FEC recommendation component 198, the application processor 1406, the cellular baseband processor 1424, and/or the transceiver(s) 1422 of the apparatus 1404 in FIG. 14.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see UE 350 of FIG. 3) and include the additional modules of the apparatus 1404.

As discussed supra, the FEC recommendation component 198 may be configured to compute a FEC rate (F) for at least one PDU set size (f) and a number of partitions (D) for a division of the at least one PDU set size (f). The FEC recommendation component 198 may also be configured to transmit, for a network entity, at least one of: (1) an indication of the computed FEC rate (F) and the computed number of partitions (D) for at least one PDU set size (f), or (2) at least one PDU set based on the computed FEC rate (F) and the computed number of partitions (D). The FEC recommendation component 198 may be within the cellular baseband processor 1424, the application processor 1406, or both the cellular baseband processor 1424 and the application processor 1406. The FEC recommendation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for computing a FEC rate (F) for at least one PDU set size (f) and a number of partitions (D) for a division of the at least one PDU set size (f). The apparatus 1404 may further include means for transmitting, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

In one configuration, the at least one PDU set size may be at least one frame size, or at least one slice size.

In another configuration, the means for computing the FEC rate (F) and the number of partitions (D) may include configuring the apparatus 1404 to compute the FEC rate (F) and the number of partitions (D) with a modem of the UE.

In another configuration, the means for computing the FEC rate (F) and the number of partitions (D) may include configuring the apparatus 1404 to compute the FEC rate (F) and the number of partitions (D) with an App running on the UE.

In another configuration, the network entity corresponds to a base station, a UPF, or an application server.

In another configuration, the apparatus 1404 may further include means for calculating a number of TBs (K) for the at least one PDU set size (f) based on a maximum possible TB size (T), where $$K = \text{ceil}\left(\frac{f}{T}\right).$$

In another configuration, to means for computing the FEC rate (F) for the at least one PDU set size (f) and the number of partitions (D) for the division of the at least one PDU set size (f) may include configuring the apparatus 1404 to compute the FEC rate (F) for the at least one PDU set size (f) and the number of partitions (D) for the division of the at least one PDU set size (f) based on a comparison of the calculated number of TBs (K) with a pre-defined minimum number of TBs ($K_{min}$). In some implementations, if the calculated number of TBs (K) is smaller than the pre-defined minimum number of TBs ($K_{min}$) (K<$K_{min}$), the FEC rate (F) may be computed based on the pre-defined minimum number of TBs ($K_{min}$) and the number of partitions (D) may be equal to the pre-defined minimum number of TBs ($K_{min}$) (F ($K_{min}$), D=$K_{min}$). In some implementations, if the calculated number of TBs (K) is greater than or equal to the pre-defined minimum number of TBs ($K_{min}$) (K≥$K_{min}$), the FEC rate (F) may be computed based on the calculated number of TBs (K) and the number of partitions (D) may be equal to one (F(K), D=1). In some implementations, the pre-defined minimum number of TBs ($K_{min}$) may be based on: an FEC granularity, a packet delay budget (PDB), or a combination thereof. In some implementations, the pre-defined minimum number of TBs ($K_{min}$) is greater than one. In some implementations, the maximum possible TB size (T) may correspond to an amount of information that can be carried in a current slot if all RBs are assigned to the UE. In some implementations, to calculate the maximum possible TB size (T) may include calculating the maximum possible TB size (T) based on: an MCS, a TB size history, an RB allocation history, or a combination thereof.

In another configuration, the apparatus 1404 may further include means for receiving, from the network entity, one or more PDU set packets based on the computed FEC rate (F) and the computed number of partitions (D) for the at least one PDU set size (f).

The means may be the FEC recommendation component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
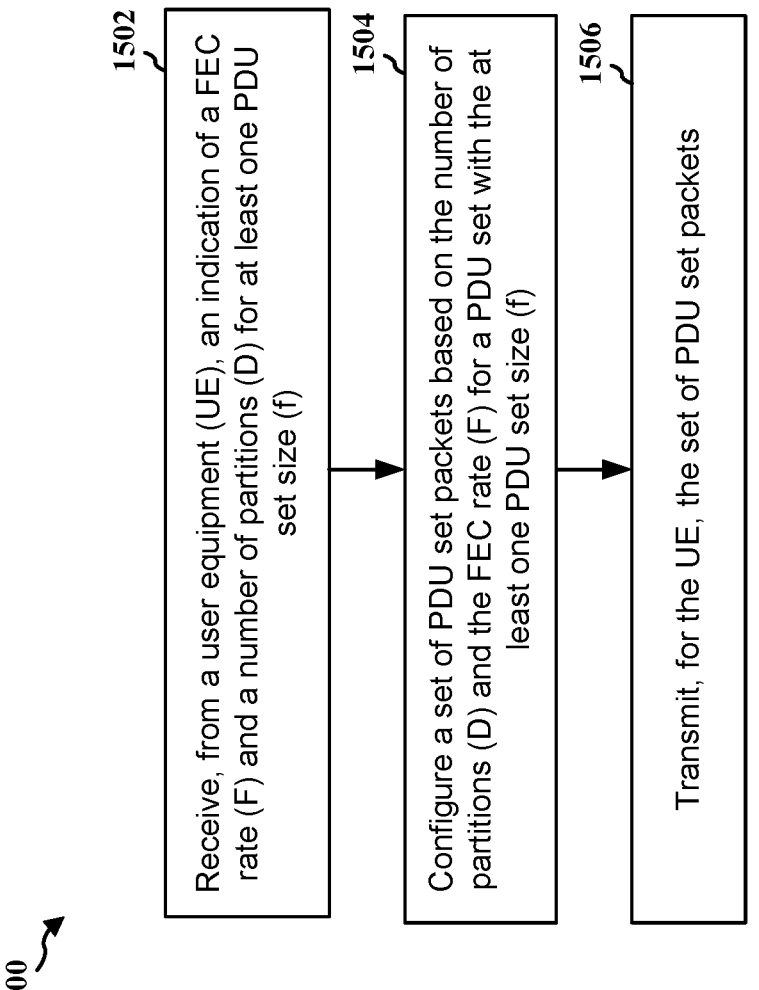
FIG. 15 is a flowchart of a method of wireless communication.

FIG. 15 is a flowchart 1500 of a method of wireless communication. The method may be performed by a network entity (e.g., the base station 102; the transmitting entity 402; the server 608, 708, 808; the network entity 1602). The method may enable the network entity to limit the number of TBs per PDU set (e.g., per frame) to a specified number (e.g., to a specified minimum K ($K_{min}$)), such that the network entity may not be specified to transmit a large number of packets in one TB or in few TBs.

At 1502, the network entity may receive, from a UE, an indication of a FEC rate (F) and a number of partitions (D) for at least one PDU set size (f), such as described in connection with FIGS. 6 and 7. For example, as shown at 620 of FIG. 6, the server 608 may receive an indication of a FEC rate (F) and a number of partitions (D) for at least one PDU set size (f) from the UE 622. The reception of the indication may be performed by, e.g., the FEC configuration component 199, the RU processor 1642, and/or the transceiver(s) 1646 of the network entity 1602 in FIG. 16.

In one example, the number of partitions (D) and the FEC rate (F) are based on a comparison of a number of TBs (K) for the at least one PDU set size (f) with a pre-defined minimum number of TBs ($K_{min}$). In some implementations, if the number of TBs (K) is smaller than the pre-defined minimum number of TBs ($K_{min}$) (K<$K_{min}$), the FEC rate (F) may be based on the pre-defined minimum number of TBs ($K_{min}$) and the number of partitions (D) may be equal to the pre-defined minimum number of TBs ($K_{min}$) (F ($K_{min}$), D=$K_{min}$). In some implementations, if the number of TBs (K) is greater than or equal to the pre-defined minimum number of TBs ($K_{min}$) (K≥$K_{min}$), the FEC rate (F) may be based on the number of TBs (K) and the number of partitions (D) may be equal to one (F(K), D=1). In some implementations, the pre-defined minimum number of TBs ($K_{min}$) is based on: an FEC granularity, a PDB, or a combination thereof. In some implementations, the pre-defined minimum number of TBs ($K_{min}$) is greater than one.

In another example, the at least one PDU set size is at least one frame size, or at least one slice size.

In another example, where the network entity corresponds to a base station, a UPF, or an application server.

At 1504, the network entity may configure a set of packets based on the number of partitions (D) and the FEC rate (F) for a PDU set with the at least one PDU set size (f), such as described in connection with FIGS. 6 and 7. For example, as discussed in connection with FIG. 6, the server 608 may generate frame packets with the recommended FEC rate (F) (e.g., with a % redundancy). For example, the server 608 may spread out the generation of all frame packets (e.g., source packets plus redundant packets) over D different partitions. The configuration of the set of packets may be performed by, e.g., the FEC configuration component 199, the RU processor 1642, and/or the transceiver(s) 1646 of the network entity 1602 in FIG. 16.

In one example, to configure the set of packets based on the number of partitions (D) and the FEC rate (F) for the PDU set with the at least one PDU set size (f), the network entity may generate the set of packets based on applying the FEC rate (F) to the PDU set, and allocate the set of packets into D partitions. In some implementations, a time difference between two consecutive partitions in the D partitions may be greater than or equal to a maximum slot duration.

At 1506, the network entity may transmit, for the UE, the set of packets, such as described in connection with FIGS. 6 and 7. For example, as discussed in connection with FIG. 6, the server 608 may transmit frame packets (e.g., to the receiving entity, the UE, etc.) over multiple TBs (e.g., to the UE 622). The transmission of the set of packets may be performed by, e.g., the FEC configuration component 199, the RU processor 1642, and/or the transceiver(s) 1646 of the network entity 1602 in FIG. 16.

Figure 16:
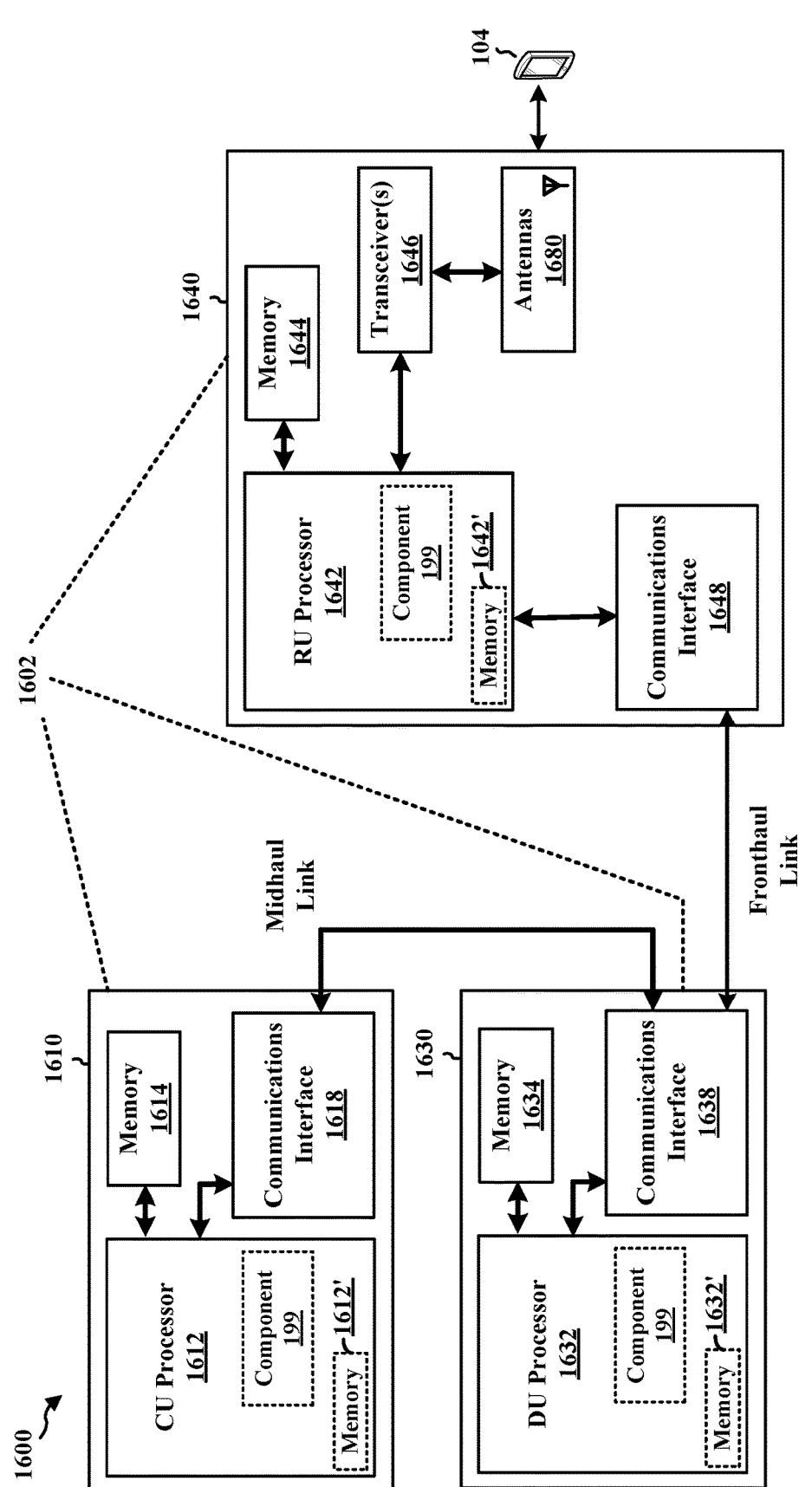
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the FEC configuration component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the FEC configuration component 199 may be configured to receive, from a UE, an indication of a FEC rate (F) and a number of partitions (D) for at least one PDU set size (f). The FEC configuration component 199 may also be configured to configure a set of packets based on the number of partitions (D) and the FEC rate (F) for a PDU set with the at least one PDU set size (f). The FEC configuration component 199 may also be configured to transmit, for the UE, the set of packets. The FEC configuration component 199 may be within one or more processors of one or more of the CU 1610, DU 1630, and the RU 1640. The FEC configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may include means for receiving, from a UE, an indication of a FEC rate (F) and a number of partitions (D) for at least one PDU set size (f). The network entity 1602 may further include means for configuring a set of packets based on the number of partitions (D) and the FEC rate (F) for a PDU set with the at least one PDU set size (f). The network entity 1602 may further include means for transmitting, for the UE, the set of packets.

In one configuration, the number of partitions (D) and the FEC rate (F) are based on a comparison of a number of TBs (K) for the at least one PDU set size (f) with a pre-defined minimum number of TBs ($K_{min}$). In some implementations, if the number of TBs (K) is smaller than the pre-defined minimum number of TBs ($K_{min}$) ($K<K_{min}$), the FEC rate (F) may be based on the pre-defined minimum number of TBs ($K_{min}$) and the number of partitions (D) may be equal to the pre-defined minimum number of TBs ($K_{min}$) (F ($K_{min}$), D=$K_{min}$). In some implementations, if the number of TBs (K) is greater than or equal to the pre-defined minimum number of TBs ($K_{min}$) ($K \geq K_{min}$), the FEC rate (F) may be based on the number of TBs (K) and the number of partitions (D) may be equal to one (F(K), D=1). In some implementations, the pre-defined minimum number of TBs ($K_{min}$) is based on: an FEC granularity, a PDB, or a combination thereof. In some implementations, the pre-defined minimum number of TBs ($K_{min}$) is greater than one.

In another configuration, the at least one PDU set size is at least one frame size, or at least one slice size.

In another configuration, where the network entity 1602 corresponds to a base station, a UPF, or an application server.

In another configuration, the means for configuring the set of packets based on the number of partitions (D) and the FEC rate (F) for the PDU set with the at least one PDU set size (f) includes configuring the network entity 1602 to generate the set of packets based on applying the FEC rate (F) to the PDU set, and allocate the set of packets into D partitions. In some implementations, a time difference between two consecutive partitions in the D partitions may be greater than or equal to a maximum slot duration.

The means may be the FEC configuration component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: compute a FEC rate (F) for at least one PDU set size (f) and a number of partitions (D) for a division of the at least one PDU set size (f); and transmit, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

Aspect 2 is the method of aspect 1, further including: calculating a number of TBs (K) for the at least one PDU set size (f) based on a maximum possible TB size (T), where $$K = \mathrm{ceil}\left(\frac{f}{T}\right).$$

Aspect 3 is the method of aspect 2, where computing the FEC rate (F) for the at least one PDU set size (f) and the number of partitions (D) for the division of the at least one PDU set size (f) includes: computing the FEC rate (F) for the at least one PDU set size (f) and the number of partitions (D) for the division of the at least one PDU set size (f) based on a comparison of the calculated number of TBs (K) with a pre-defined minimum number of TBs ($K_{min}$).

Aspect 4 is the method of aspect 3, where, if the calculated number of TBs (K) is smaller than the pre-defined minimum number of TBs ($K_{min}$) ($K < K_{min}$), the FEC rate (F) is computed based on the pre-defined minimum number of TBs ($K_{min}$) and the number of partitions (D) is equal to the pre-defined minimum number of TBs ($K_{min}$) (F ($K_{min}$), $D = K_{min}$).

Aspect 5 is the method of aspect 3, where, if the calculated number of TBs (K) is greater than or equal to the pre-defined minimum number of TBs ($K_{min}$) ($K \geq K_{min}$), the FEC rate (F) is computed based on the calculated number of TBs (K) and the number of partitions (D) is equal to one (F(K), D=1).

Aspect 6 is the method of aspect 3, where the pre-defined minimum number of TBs ($K_{min}$) is based on: an FEC granularity, a PDB, or a combination thereof.

Aspect 7 is the method of aspect 3, where the pre-defined minimum number of TBs ($K_{min}$) is greater than one.

Aspect 8 is the method of aspect 2, where the maximum possible TB size (T) corresponds to an amount of information that can be carried in a current slot if all RBs are assigned to the UE.

Aspect 9 is the method of aspect 2, where calculating the maximum possible TB size (T) includes calculating the maximum possible TB size (T) based on: an MCS, a TB size history, an RB allocation history, or a combination thereof.

Aspect 10 is the method of any of aspects 1 to 9, where the at least one PDU set size is at least one frame size, or at least one slice size.

Aspect 11 is the method of any of aspects 1 to 10, further including: receiving, from the network entity, one or more PDU set packets based on the computed FEC rate (F) and the computed number of partitions (D) for the at least one PDU set size (f).

Aspect 12 is the method of any of aspects 1 to 11, where computing the FEC rate (F) and the number of partitions (D) includes computing the FEC rate (F) and the number of partitions (D) with a modem of the UE.

Aspect 13 is the method of any of aspects 1 to 12, where computing the FEC rate (F) and the number of partitions (D) includes computing the FEC rate (F) and the number of partitions (D) with an App running on the UE.

Aspect 14 is the method of any of aspects 1 to 13, where the network entity corresponds to a base station, a UPF, or an application server.

Aspect 15 is an apparatus for wireless communication at a UE, including: a memory; and at least one processor coupled to the memory and, based at least in part on information stored in the memory, the at least one processor is configured to implement any of aspects 1 to 14.

Aspect 16 is the apparatus of aspect 15, further including at least one of a transceiver or an antenna coupled to the at least one processor, where to transmit at least one of (1) the indication or (2) the at least one PDU set, the at least one processor is configured to transmit, for the network entity via at least one of the transceiver or of the antenna, at least one of (1) the indication or (2) the at least one PDU set.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at a network entity, including: receiving, from a UE, an indication of a FEC rate (F) and a number of partitions (D) for at least one PDU set size (f); configuring a set of packets based on the number of partitions (D) and the FEC rate (F) for a PDU set with the at least one PDU set size (f); and transmitting, for the UE, the set of packets.

Aspect 20 is the method of aspect 19, where configuring the set of packets based on the number of partitions (D) and the FEC rate (F) for the PDU set with the at least one PDU set size (f) includes: generating the set of packets based on applying the FEC rate (F) to the PDU set; and allocating the set of packets into D partitions.

Aspect 21 is the method of aspect 20, where a time difference between two consecutive partitions in the D partitions is greater than or equal to a maximum slot duration.

Aspect 22 is the method of any of aspects 19 to 21, where the number of partitions (D) and the FEC rate (F) are based on a comparison of a number of TBs (K) for the at least one PDU set size (f) with a pre-defined minimum number of TBs $(K_{min})$.

Aspect 23 is the method of aspect 22, where, if the number of TBs (K) is smaller than the pre-defined minimum number of TBs $(K_{min})$ $(K<K_{min})$, the FEC rate (F) is based on the pre-defined minimum number of TBs $(K_{min})$ and the number of partitions (D) is equal to the pre-defined minimum number of TBs $(K_{min})$ $(F(K_{min}), D=K_{min})$.

Aspect 24 is the method of aspect 22, where, if the number of TBs (K) is greater than or equal to the pre-defined minimum number of TBs $(K_{min})$ $(K≥K_{min})$, the FEC rate (F) is based on the number of TBs (K) and the number of partitions (D) is equal to one (F(K), D=1).

Aspect 25 is the method of aspect 22, where the pre-defined minimum number of TBs $(K_{min})$ is based on: an FEC granularity, a PDB, or a combination thereof.

Aspect 26 is the method of aspect 22, where the pre-defined minimum number of TBs $(K_{min})$ is greater than one.

Aspect 27 is the method of any of aspects 19 to 26, where the at least one PDU set size is at least one frame size, or at least one slice size.

Aspect 28 is the method of any of aspects 19 to 26, where the network entity corresponds to a base station, a UPF, or an application server.

Aspect 29 is an apparatus for wireless communication at a network entity, including: a memory; and at least one processor coupled to the memory and, based at least in part on information stored in the memory, the at least one processor is configured to implement any of aspects 19 to 28.

Aspect 30 is the apparatus of aspect 29, further including at least one of a transceiver or an antenna coupled to the at least one processor, where to receive the indication, the at least one processor is configured to receive, from the UE via at least one of the transceiver or of the antenna, the indication.

Aspect 31 is an apparatus for wireless communication including means for implementing any of aspects 19 to 28.

Aspect 32 is a computer-readable medium (e.g., a non-transitory computer-readable medium) storing computer executable code, where the code when executed by a processor causes the processor to implement any of aspects 19 to 28.

What is claimed is:

1. An apparatus for wireless communication at a user equipment (UE), comprising:

at least one memory; and at least one processor coupled to the at least one memory and, based at least in part on first information stored in the at least one memory, the at least one processor is configured to:

calculate a number of transport blocks (TBs) (K) for at least one protocol data unit (PDU) set size (f) based on a maximum possible TB size (T), wherein $$K = \text{ceil}\left(\frac{f}{T}\right);$$

compute a forward error correction (FEC) rate (F) for the at least one PDU set size (f) and a number of partitions (D) for a division of the at least one PDU set size (f) based on a comparison of the calculated number of TBs (K) with a pre-defined minimum number of TBs $(K_{min})$, wherein the pre-defined minimum number of TBs $(K_{min})$ is based on a packet delay budget (PDB); and transmit, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

2. The apparatus of claim 1, wherein, if the calculated number of TBs (K) is smaller than the pre-defined minimum number of TBs $(K_{min})$ $(K<K_{min})$, the at least one processor is configured to compute the FEC rate (F) based on the pre-defined minimum number of TBs $(K_{min})$ and the number of partitions (D) is equal to the pre-defined minimum number of TBs $(K_{min})$ $(F(K_{min}), D=K_{min})$.

3. The apparatus of claim 1, wherein, if the calculated number of TBs (K) is greater than or equal to the pre-defined minimum number of TBs $(K_{min})$ $(K≥K_{min})$, the at least one processor is configured to compute the FEC rate (F) based on the calculated number of TBs (K) and the number of partitions (D) is equal to one (F (K), D=1).

4. The apparatus of claim 1, wherein the pre-defined minimum number of TBs $(K_{min})$ is further based on an FEC granularity.

5. The apparatus of claim 1, wherein the pre-defined minimum number of TBs ($K_{min}$) is greater than one.

6. The apparatus of claim 1, wherein the maximum possible TB size (T) corresponds to an amount of information that can be carried in a current slot if all resource blocks (RBs) are assigned to the UE.

7. The apparatus of claim 1, wherein to calculate the maximum possible TB size (T), the at least one processor is configured to calculate the maximum possible TB size (T) based on:

a modulation and coding scheme (MCS), a TB size history, a resource block (RB) allocation history, or a combination thereof.

8. The apparatus of claim 1, wherein the at least one PDU set size is at least one frame size, or at least one slice size.

9. The apparatus of claim 1, wherein the at least one processor is further configured to:

receive, from the network entity, one or more PDU set packets based on the computed FEC rate (F) and the computed number of partitions (D) for the at least one PDU set size (f).

10. The apparatus of claim 1, wherein to compute the FEC rate (F) and the number of partitions (D), the at least one processor is configured to compute the FEC rate (F) and the number of partitions (D) with a modem of the UE.

11. The apparatus of claim 1, wherein to compute the FEC rate (F) and the number of partitions (D), the at least one processor is configured to compute the FEC rate (F) and the number of partitions (D) with an application (App) running on the UE.

12. The apparatus of claim 1, further comprising at least one of a transceiver or an antenna coupled to the at least one processor, wherein to transmit at least one of (1) the indication or (2) the at least one PDU set, the at least one processor is configured to transmit, for the network entity via at least one of the transceiver or the antenna, at least one of (1) the indication or (2) the at least one PDU set, and wherein the network entity corresponds to a base station, a user plane function (UPF), or an application server.

13. A method of wireless communication at a user equipment (UE), comprising:

calculating a number of transport blocks (TBs) (K) for at least one protocol data unit (PDU) set size (f) based on a maximum possible TB size (T), wherein $$K = \text{ceil}\left(\frac{f}{T}\right);$$

computing a forward error correction (FEC) rate (F) for the at least one PDU set size (f) and a number of partitions (D) for a division of the at least one PDU set size (f) based on a comparison of the calculated number of TBs (K) with a pre-defined minimum number of TBs ($K_{min}$), wherein the pre-defined minimum number of TBs ($K_{min}$) is based on a packet delay budget (PDB); and transmitting, for a network entity, at least one of: (1) an indication of the computed FEC rate (F) and the computed number of partitions (D) for at least one PDU set size (f), or (2) at least one PDU set based on the computed FEC rate (F) and the computed number of partitions (D).

14. The method of claim 13, wherein, if the calculated number of TBs (K) is smaller than the pre-defined minimum number of TBs ($K_{min}$) ($K < K_{min}$), the FEC rate (F) is computed based on the pre-defined minimum number of TBs ($K_{min}$) and the number of partitions (D) is equal to the pre-defined minimum number of TBs ($K_{min}$) (F($K_{min}$), D=$K_{min}$), and wherein, if the calculated number of TBs (K) is greater than or equal to the pre-defined minimum number of TBs ($K_{min}$) (K≥$K_{min}$), the FEC rate (F) is computed based on the calculated number of TBs (K) and the number of partitions (D) is equal to one (F(K), D=1).

15. The method of claim 13, further comprising:

receiving, from the network entity, one or more PDU set packets based on the computed FEC rate (F) and the computed number of partitions (D) for the at least one PDU set size (f).

16. An apparatus for wireless communication at a network entity, comprising:

at least one memory; and at least one processor coupled to the at least one memory and, based at least in part on first information stored in the at least one memory, the at least one processor is configured to:

receive, from a user equipment (UE), an indication of a forward error correction (FEC) rate (F) and a number of partitions (D) for at least one protocol data unit (PDU) set size (f);

configure a set of packets based on the number of partitions (D) and the FEC rate (F) for a PDU set with the at least one PDU set size (f), wherein the number of partitions (D) and the FEC rate (F) are based on a comparison of a number of transport blocks TBs) (K) for the at least one PDU set size (f) with a pre-defined minimum number of TBs ($K_{min}$), wherein the pre-defined minimum number of TBs ($K_{min}$) is based on a packet delay budget (PDB); and transmit, for the UE, the set of packets.

17. The apparatus of claim 16, wherein to configure the set of packets based on the number of partitions (D) and the FEC rate (F) for the PDU set with the at least one PDU set size (f), the at least one processor is configured to:

generate the set of packets based on applying the FEC rate (F) to the PDU set; and allocate the set of packets into D partitions.

18. The apparatus of claim 17, wherein a time difference between two consecutive partitions in the D partitions is greater than or equal to a maximum slot duration.

19. The apparatus of claim 16, wherein, if the number of TBs (K) is smaller than the pre-defined minimum number of TBs ($K_{min}$) ($K < K_{min}$), the FEC rate (F) is based on the pre-defined minimum number of TBs ($K_{min}$) and the number of partitions (D) is equal to the pre-defined minimum number of TBs ($K_{min}$) (F ($K_{min}$), D=$K_{min}$).

20. The apparatus of claim 16, wherein, if the number of TBs (K) is greater than or equal to the pre-defined minimum number of TBs ($K_{min}$) (K≥$K_{min}$), the FEC rate (F) is based on the number of TBs (K) and the number of partitions (D) is equal to one (F (K), D=1).

21. The apparatus of claim 16, wherein the pre-defined minimum number of TBs ($K_{min}$) is further based on an FEC granularity.

22. The apparatus of claim 16, wherein the pre-defined minimum number of TBs ($K_{min}$) is greater than one.

23. The apparatus of claim 16, wherein the at least one PDU set size is at least one frame size, or at least one slice size.

24. The apparatus of claim 16, further comprising at least one of a transceiver or an antenna coupled to the at least one processor, wherein to receive the indication, the at least one processor is configured to receive, from the UE via at least one of the transceiver or the antenna, the indication, and wherein the network entity corresponds to a base station, a user plane function (UPF), or an application server.

25. A method of wireless communication at a network entity, comprising:

receiving, from a user equipment (UE), an indication of a forward error correction (FEC) rate (F) and a number of partitions (D) for at least one protocol data unit (PDU) set size (f);

configuring a set of packets based on the number of partitions (D) and the FEC rate (F) for a PDU set with the at least one PDU set size (f), wherein the number of partitions (D) and the FEC rate (F) are based on a comparison of a number of transport blocks (TBs) (K) for the at least one PDU set size (f) with a pre-defined minimum number of TBs ($K_{min}$), wherein the pre-defined minimum number of TBs ($K_{min}$) is based on a packet delay budget (PDB); and transmitting, for the UE, the set of packets.

* * * * *